(12) United States Patent
Shiomi et al.

(10) Patent No.: US 10,273,856 B2
(45) Date of Patent: Apr. 30, 2019

(54) REGENERATIVE ENGINE DEVICE

(71) Applicant: YANMAR CO., LTD., Osaka-shi, Osaka (JP)

(72) Inventors: Hideo Shiomi, Osaka (JP); Taiki Hori, Osaka (JP)

(73) Assignee: YANMAR CO., LTD., Osaka (JP)

( * ) Notice: Subject to any disclaimer, the term of this patent is extended or adjusted under 35 U.S.C. 154(b) by 80 days.

(21) Appl. No.: 15/270,516

(22) Filed: Sep. 20, 2016

(65) Prior Publication Data

US 2017/0009634 A1 Jan. 12, 2017

Related U.S. Application Data

(63) Continuation of application No. PCT/JP2015/056658, filed on Mar. 6, 2015.

(30) Foreign Application Priority Data

Mar. 25, 2014 (JP) .................................. 2014-062619
Mar. 25, 2014 (JP) .................................. 2014-062620

(51) Int. Cl.
*F01N 3/00* (2006.01)
*F01N 9/00* (2006.01)
(Continued)

(52) U.S. Cl.
CPC .............. *F01N 9/002* (2013.01); *F01N 3/023* (2013.01); *F02D 31/007* (2013.01);
(Continued)

(58) Field of Classification Search
CPC ........... F02D 41/029; F02D 2200/0812; F02D 2200/604; F02D 31/007; F02D 41/0245;
(Continued)

(56) References Cited

U.S. PATENT DOCUMENTS

2005/0050883 A1* 3/2005 Nishimura .............. F01N 3/035
60/286
2010/0095656 A1 4/2010 Kamiya et al.
(Continued)

FOREIGN PATENT DOCUMENTS

EP 2568136 A1 3/2013
EP 2578826 A1 4/2013
(Continued)

*Primary Examiner* — Audrey K Bradley
*Assistant Examiner* — Anthony Ayala Delgado
(74) *Attorney, Agent, or Firm* — Norton Rose Fulbright US LLP

(57) ABSTRACT

An engine device includes an engine, an exhaust gas purification device arranged on an exhaust path of the engine, and an engine control device that controls drive of the engine. The engine control device executes a plurality of regeneration controls with which particulate matter accumulated in the exhaust gas purification device is combusted and removed. As the plurality of regeneration controls, at least non-work regeneration control, in which an exhaust gas temperature is raised in combination of post-injection and a predetermined high rotational speed, is included. The engine control device drives the engine so as to solely combust and remove the particulate matter in the non-work regeneration control and compulsorily executes isochronous control in which a rotational speed of the engine is maintained constant, irrespective of variation in load of the engine.

10 Claims, 23 Drawing Sheets

(51) Int. Cl.
  *F02D 41/02* (2006.01)
  *F02D 41/40* (2006.01)
  *F02D 31/00* (2006.01)
  *F01N 3/023* (2006.01)
  *E02F 9/20* (2006.01)
  *E02F 9/26* (2006.01)

(52) U.S. Cl.
  CPC ....... *F02D 41/029* (2013.01); *F02D 41/0245* (2013.01); *F02D 41/402* (2013.01); *E02F 9/2066* (2013.01); *E02F 9/268* (2013.01); *F01N 2430/00* (2013.01); *F02D 2200/0812* (2013.01); *F02D 2200/604* (2013.01); *Y02T 10/26* (2013.01); *Y02T 10/44* (2013.01)

(58) Field of Classification Search
  CPC .... F02D 41/402; F02D 29/02; F01N 2430/00; F01N 9/002; F01N 3/023; B60W 10/06
  See application file for complete search history.

(56) References Cited

U.S. PATENT DOCUMENTS

| | | |
|---|---|---|
| 2010/0170227 A1 | 7/2010 | Tsukada et al. |
| 2011/0173958 A1* | 7/2011 | Masuda .................. F01N 9/002 60/285 |
| 2012/0124979 A1 | 5/2012 | Noma |
| 2013/0086890 A1 | 4/2013 | Noma et al. |
| 2013/0202493 A1 | 8/2013 | Noma et al. |
| 2014/0054902 A1 | 2/2014 | Kawaguchi et al. |

FOREIGN PATENT DOCUMENTS

| | | |
|---|---|---|
| JP | 2000-145430 A | 5/2000 |
| JP | 2003-027922 A | 1/2003 |
| JP | 2005-113752 A | 4/2005 |
| JP | 2009-079501 A | 4/2009 |
| JP | 2009-180181 A | 8/2009 |
| JP | 2011-012612 A | 1/2011 |
| JP | 2011-132836 A | 7/2011 |
| WO | 2009/060719 A1 | 5/2009 |
| WO | 2010/024012 A1 | 3/2010 |

* cited by examiner

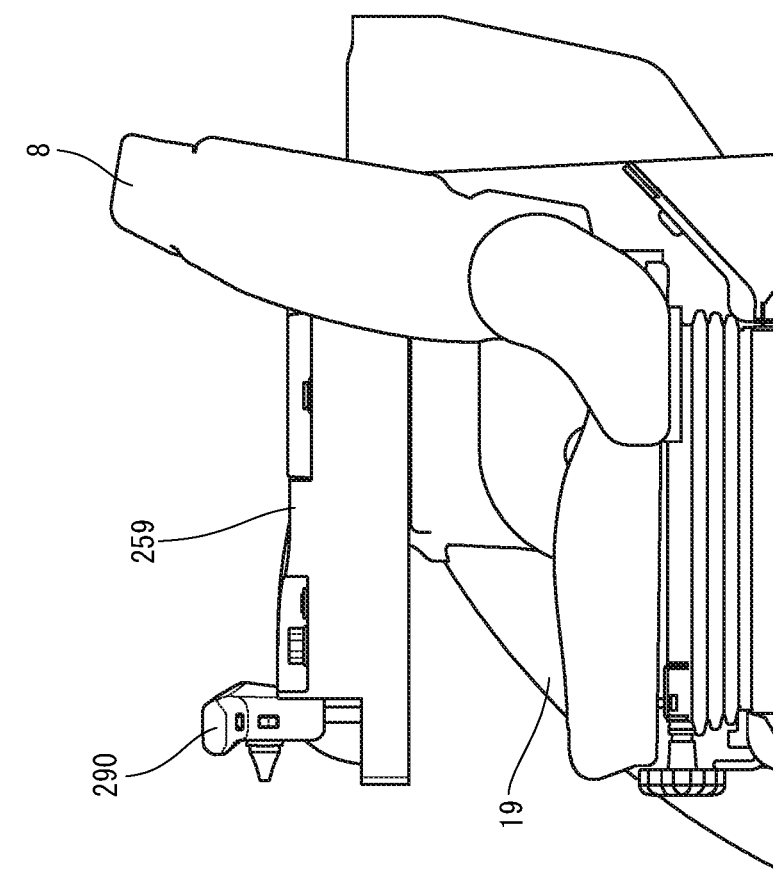
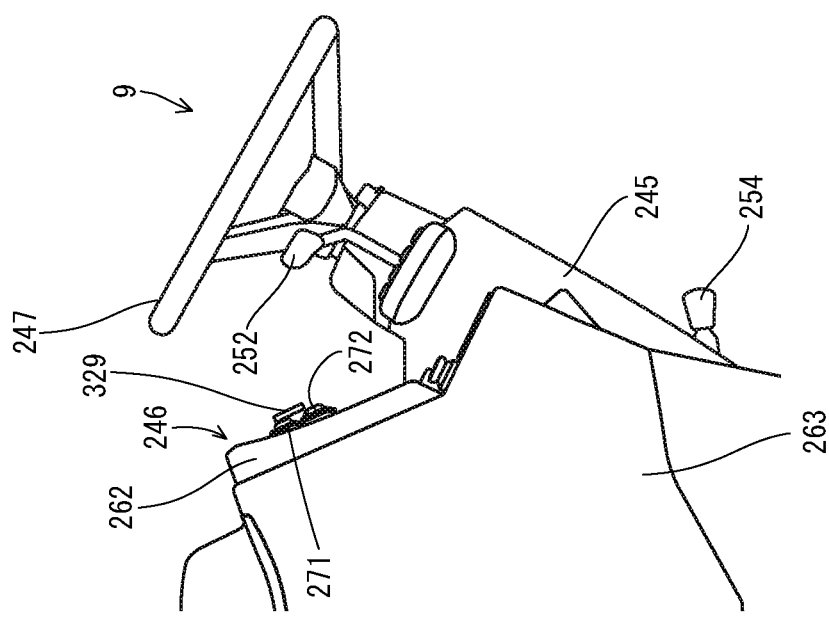
FIG.5

FIG.23

| DPF REGENERATION MODE | CONTENT OF CONTROL | |
|---|---|---|
| ASSIST REGENERATION | REGENERATION AUXILIARY DEVICE IS USED | WORK CAN BE CONTINUOUSLY PERFORMED (WORK REGENERATION CONTROL) |
| RESET REGENERATION | POST-INJECTION IS JOINTLY USED IN ASSIST REGENERATION | |
| STATIONARY REGENERATION | RESET REGENERATION IS PERFORMED WITH ROTATIONAL SPEED FIXED | WORK IS STOPPED (NON-WORK REGENERATION CONTROL) |
| RECOVERY REGENERATION | EXECUTES AFTER THE FAILURE OF STATIONARY REGENERATION | |

REGENERATIVE ENGINE DEVICE

CROSS-REFERENCE TO RELATED APPLICATIONS

The present application is a continuation application of International Application No. PCT/JP2015/56658, filed Mar. 6, 2015, which claims priority to Japanese Patent Application No. 2014-62619, filed Mar. 25, 2014, and Japanese Patent Application No. 2014-62620, filed Mar. 25, 2014. The contents of these applications are incorporated herein by reference in their entirety.

BACKGROUND OF THE INVENTION

The present invention of the instant application relates to an engine device.

Conventionally, as for measures for exhaust gas of diesel engines (hereinafter merely referred to an engine), there have been known technologies in which an exhaust gas purification device (diesel particulate filter) is provided in the exhaust path of the engine, thereby collecting particulate matter (PM) and the like in the exhaust gas and suppressing the release of the exhaust gas into the atmosphere (for example, see Japanese Unexamined Patent Application Publication 2000-145430 and Japanese Unexamined Patent Application Publication 2003-27922). When PM collected with the exhaust gas purification device exceeds a prescribed amount, circulation resistance in the exhaust gas purification device increases, which leads to reduction in engine output, and therefore PM accumulated in the exhaust gas purification device due to an increase in temperature of the exhaust gas is removed, and the PM collection capacity of the exhaust gas purification device is restored (regenerated). When the temperature of the exhaust gas is increased, and the exhaust gas purification device is not sufficiently regenerated, unburned fuel is supplied into the exhaust gas purification device, and the PM is combusted, which makes it possible to facilitate the regeneration of the exhaust gas purification device. The technology of the aforementioned reset regeneration is known.

SUMMARY OF THE INVENTION

However, even when reset generation, in which unburned fuel is supplied into the exhaust gas purification device, is executed, and when an operating state where the action of an increase in temperature is not sufficiently obtained persists, there is a case where the PM is excessively accumulated in the exhaust gas purification device. When the regeneration of the exhaust gas purification device is performed under the circumstances, the rapid combustion (runaway combustion) of the PM excessively accumulated causes damages such as cracks and dissolved loss in the exhaust gas purification device.

As for an engine device mounted on a work vehicle, there is a case where the rotational speed of the engine during no load running is limited, and the engine is driven so as to suppress fuel consumption or noise in a low load operation. However, when the rotational speed of the engine is limited, and the engine is driven, there is a case where the temperature of the exhaust gas cannot be sufficiently increased, which leads to reduction in the regeneration capacity of the exhaust gas purification device.

Also, as the control method of a fuel injection amount, isochronous control and droop control have been known, and in some vehicles, an operator can select and designate the isochronous control and the droop control. Regarding the aforementioned engine device mounted on the work vehicle, when the droop control is designated, and the regeneration control is executed, there is a case where the rotational speed is reduced due to load applied to the engine, which leads to reduction in the regeneration capacity of the exhaust gas purification device.

Accordingly, it is an object of the present invention of the instant application to provide an engine device, in which improvements are provided in the light of the current circumstances.

An engine device according to a first aspect of the present invention includes an engine, an exhaust gas purification device arranged on an exhaust path of the engine, and an engine control device that controls drive of the engine and executes a plurality of regeneration controls with which particulate matter accumulated in the exhaust gas purification device is combusted and removed, and as the plurality of regeneration controls, at least non-work regeneration control, in which an exhaust gas temperature is raised in combination of post-injection and a predetermined high rotational speed, is included, and the engine control device drives the engine so as to solely combust and remove the particulate matter in the non-work regeneration control and compulsorily executes isochronous control in which a rotational speed of the engine is maintained constant, irrespective of variation in load of the engine.

Regarding the engine device according to the first aspect of the present invention, the present invention according to a second aspect thereof may be such that the engine control device can alternately select execution of high idle limit mode, in which the rotational speed of the engine is limited with a limit value of a high idle rotational speed, and release of the high idle limit mode, and in the non-work regeneration control, the high idle limit mode is compulsorily released, and the engine is driven at the predetermined high rotational speed that is higher than the limit value of the high idle rotational speed.

Regarding the engine device according to the first or second aspect of the present invention, the present invention according to a third aspect thereof may be such that in the non-work regeneration control, the engine control device limits output of the engine to non-work maximum output that is lower than maximum output and drives the engine.

Regarding the engine device according to any one of the first to third aspects of the present invention, the present invention according to a fourth aspect thereof may be such that at least stationary regeneration control that is executable when executable regeneration control fails during continuous work, and recovery regeneration control that is executable when the stationary regeneration control fails, are included as the non-work regeneration control, and when the engine control device executes any of the stationary regeneration control or the recovery regeneration control, the engine control device executes a compulsory operation.

Regarding the engine device according to the first aspect of the present invention, the present invention according to a fifth aspect thereof may be such that the engine control device stores an output characteristic map having a relation of the rotational speed and torque of the engine, and during execution of the high idle limit mode, after the engine control device corrects the output characteristic map based on the limit value of the high idle rotational speed, the engine control device calculates a target fuel injection amount based on the corrected output characteristic map and drives the engine.

According to the embodiment of the present invention of the instant application, the engine device includes the engine, the exhaust gas purification device arranged on the exhaust path of the engine, and the engine control device that controls the drive of the engine and executes the plurality of regeneration controls with which the particulate matter accumulated in the exhaust gas purification device is combusted and removed, and as the plurality of regeneration controls, at least the non-work regeneration control, in which the exhaust gas temperature is raised in combination of the post-injection and the predetermined high rotational speed, is included, and the engine control device drives the engine so as to solely combust and remove the particulate matter in the non-work regeneration control, so that the engine is not normally operated in the non-work regeneration control. That is, the non-work regeneration control exists as the mode for avoiding crises such as the prevention of damages (dissolved loss) of the exhaust gas purification device and the prevention of excessive emissions.

Also, according to the embodiment of the present invention of the instant application, in the non-work regeneration control, the engine control device compulsorily executes the isochronous control in which the rotational speed of the engine is maintained constant, irrespective of variation in load of the engine, and when the non-work regeneration control is executed, the engine maintains the predetermined high rotational speed and rotates, so that the temperature of the exhaust gas can be increased, and the PM in the exhaust gas purification device is compulsorily combusted and removed under favorable conditions, and the purification capacity of the exhaust gas purification device can be regenerated.

Also, according to the embodiment of the present invention of the instant application, in the non-work regeneration control, the high idle limit mode is compulsorily released, and the engine is driven at the predetermined high rotational speed that is higher than the limit value of the high idle rotational speed, and when the non-work regeneration control is executed, the engine can rotate at the predetermined high rotational speed, so that the temperature of the exhaust gas can be increased, and the PM in the exhaust gas purification device is compulsorily combusted and removed under favorable conditions, and the purification capacity of the exhaust gas purification device can be regenerated.

Also, according to the embodiment of the present invention of the instant application, in the non-work regeneration control, the output of the engine is limited to the non-work maximum output that is lower than the maximum output, so that when the non-work regeneration control is executed, excessive increase in the temperature and pressure of the exhaust gas can be prevented, thereby suppressing the deterioration of the exhaust system components such as the exhaust gas purification device due to the increase in temperature and the occurrence of leakage of the exhaust gas from the joining portion of the exhaust system components due to the increase in pressure.

BRIEF DESCRIPTION OF THE DRAWINGS

FIG. 5 is a left side view in the cabin;
FIG. 23 is a view illustrating the relation of each regeneration control.

DESCRIPTION OF THE EMBODIMENTS

Hereinafter, an embodiment, in which the present invention is embodied and exemplified by a tractor as a work vehicle, will be described based on drawings.

Figure 1:
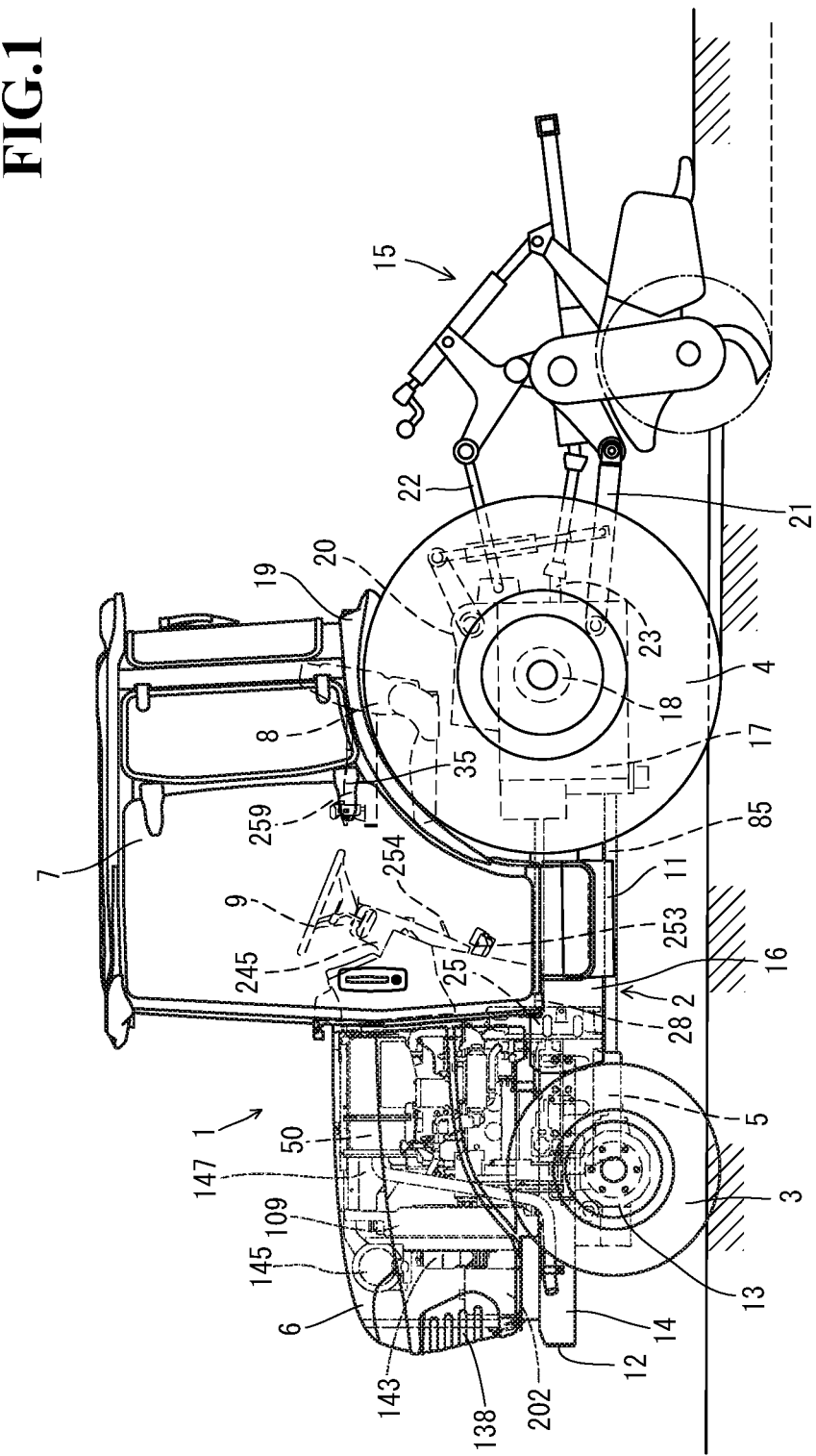
FIG. 1 is a left side view of a tractor.
Figure 2:
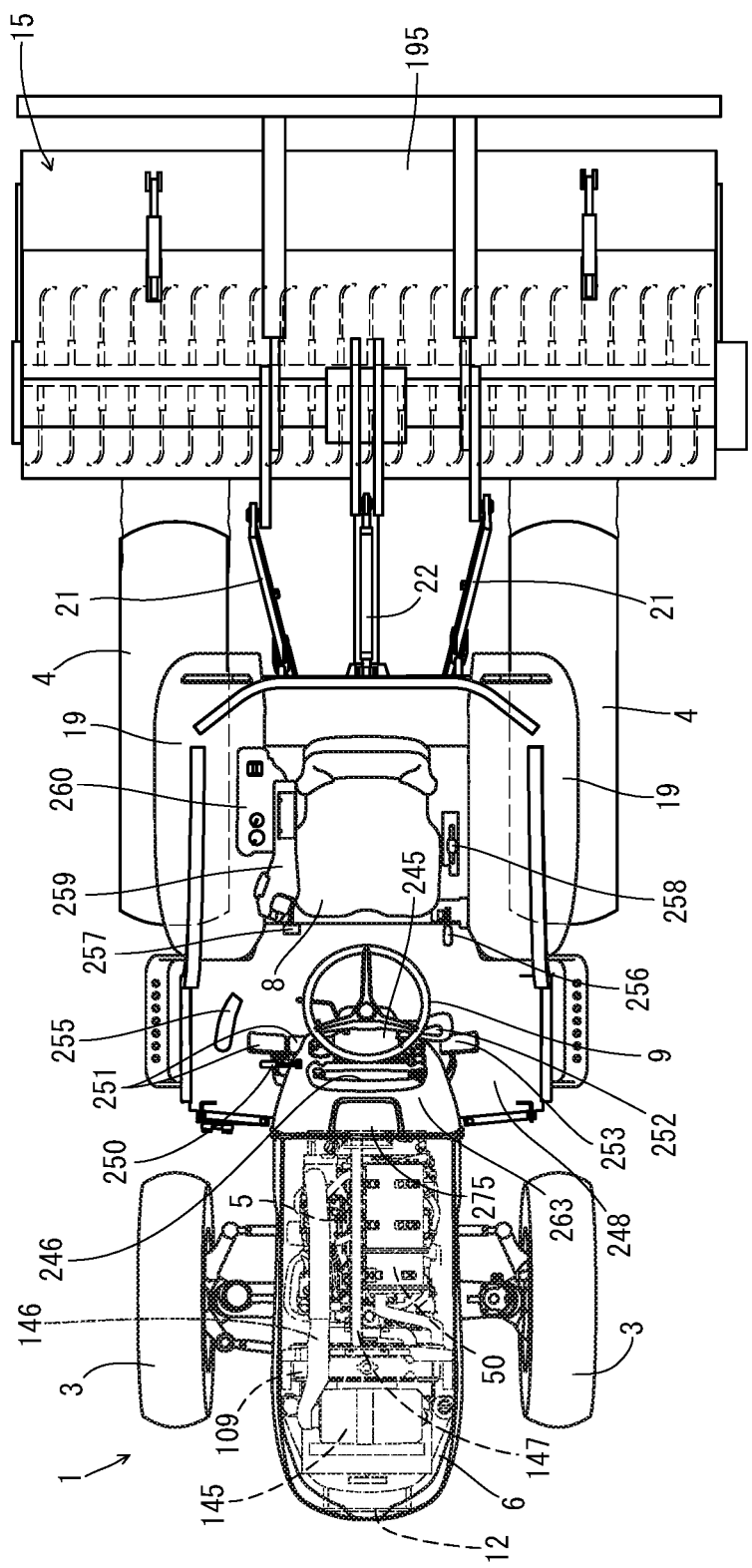
FIG. 2 is a plan view of the tractor.

To begin with, the outline of the tractor will be described referring to FIGS. 1 and 2. A travelling machine body 2 of a tractor 1 of the present embodiment is supported by a pair of right and left front wheels 3 as a travelling unit and a pair of right and left rear wheels 4 in a similar manner. It is constituted such that the rear wheels 4 and the front wheels 3 are driven by a common-rail diesel engine 5 (hereinafter merely referred to as an engine) as a power source mounted on the front portion of the travelling machine body 2, which allows the tractor 1 to move forward and backward in running. The engine 5 is covered with a hood 6. A cabin 7 is arranged on the upper surface of the travelling machine body 2, and a maneuvering seat 8 and a steering handle (round handle) 9 that moves the steering direction of the front wheels 3 to the right and left by means of steering are arranged in the interior of the cabin 7. A fuel tank 11 for supplying fuel to the engine 5 is provided on the lower side with respect to the bottom portion of the cabin 7. It is noted that for convenience' sake, the illustration of the cabin is omitted in FIG. 2.

The travelling machine body 2 is constituted by an engine frame 14 that includes a front bumper 12 and a front axle case 13, and right and left machine body frames 16 that are detachably fixed with bolts on the rear portion of the engine frame 14. A mission case 17 that appropriately shifts the rotational power from the engine 5 and transmits the power to the front wheels 3 and the rear wheels 4 is installed in the rear portion of the machine body frames 16. The rear wheels 4 are mounted on the mission case 17 via a rear axle case 18 that is mounted in such a manner as to externally protrude from the outer-side surface of the mission case 17. Sections above the right and left rear wheels 4 are covered with fenders 19 fixed on the machine body frames 16.

A hydraulic hoisting and lowering mechanism 20 for hoisting and lowering a rotary cultivator 15, as a work portion, is detachably mounted on the upper surface of the rear portion of the mission case 17. The rotary cultivator 15 is coupled with the rear portion of the mission case 17 via a three-point linkage mechanism made up of a pair of right and left lower links 21 and a top link 22. A PTO shaft 23 for transmitting a PTO drive force to the rotary cultivator 15 is installed backward in a protruding manner on the rear side surface of the mission case 17.

Figure 3:
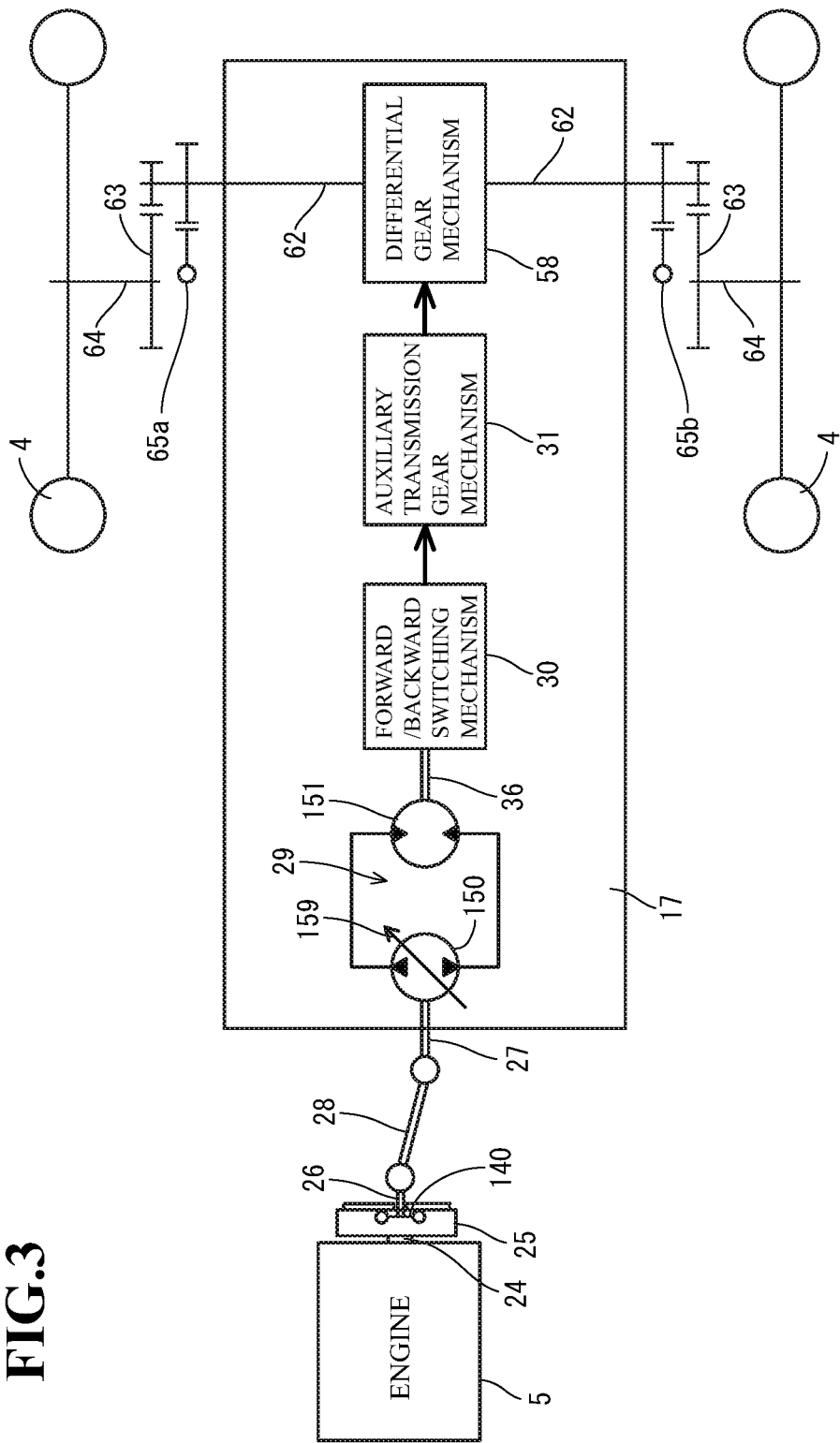
FIG. 3 is a block diagram illustrating the outline of a power transmission system.

As illustrated in FIG. 3, a flywheel 25 is mounted in such a manner as to be directly linked to an engine output shaft 24 that is installed backward in a protruding manner on the rear side surface of the engine 5. A main driving axle 26 that is coupled via the flywheel 25 and a main clutch 140 and extended backward is coupled with a main transmission input shaft 27 installed forward in a protruding manner on the mission case 17 via a stretchable, contractible power transmission shaft 28 that includes universal couplings on both ends thereof. In contrast, as illustrated in FIG. 1, a front wheel transmission shaft (not illustrated) that protrudes backward from the front axle case 13, and a front wheel output shaft (not illustrated) that protrudes forward from the front side surface of the mission case 17 are coupled via a front wheel driving shaft 85.

Also, a hydraulic continuously variable transmission 29, a forward/backward switching mechanism 30, a travelling auxiliary transmission gear mechanism 31, and a differential gear mechanism 58 are arranged in the mission case 17. The rotational power of the engine 5 is transmitted to the main transmission input shaft 27 of the mission case 17 via the power transmission shaft 28 and then appropriately shifted by the hydraulic continuously variable transmission 29 and the travelling auxiliary transmission gear mechanism 31. This shifted power is transmitted to the right and left rear wheels 4 via the differential gear mechanism 58. Also, the aforementioned shifted power is transmitted to the front axle case 13 via the front wheel driving shaft 85, thereby transmitting the shifted power to the right and left front wheels 3.

The hydraulic continuously variable transmission 29 is of an inline type in which a main transmission output shaft 36 is concentrically arranged on the main transmission input shaft 27, and the hydraulic continuously variable transmission 29 includes a variable displacement hydraulic pump unit 150 and a fixed displacement transmission hydraulic motor unit 151 that is operated by high-pressure hydraulic oil discharged from the hydraulic pump unit 150. A pump cam plate 159 that can change an inclination angle with respect to the axis line of the main transmission input shaft 27 and adjust the amount of hydraulic oil supplied is provided in the hydraulic pump unit 150. The pump cam plate 159 is associated with the main transmission hydraulic cylinder that changes and adjusts the inclination angle of the pump cam plate 159 with respect to the axis line of the main transmission input shaft 27. The inclination angle of the pump cam plate 159 is changed by the drive of the main transmission hydraulic cylinder (not illustrated), which changes and adjusts the amount of hydraulic oil supplied from the hydraulic pump unit 150 to the hydraulic motor unit 151, and the main transmission operation of the hydraulic continuously variable transmission 29 is performed.

That is, when a switching valve (not illustrated) is operated by the hydraulic oil from a proportional control valve 123 (see FIG. 13) that is operated in proportion to the manipulated variable of a main transmission lever 290 (described later in detail), the main transmission hydraulic cylinder not illustrated is driven, and in step with this, the inclination angle of the pump cam plate 159 with respect to the axis line of the main transmission input shaft 27 is changed. The pump cam plate 159 of the embodiment is such that an angle can be adjusted in a range between one (positive) maximum inclination angle and the other (negative) maximum inclination angle, interposing a neutral angle of the inclination of approximately zero degrees (prior to and subsequent to zero and inclusive of zero) therebetween, and the angle is set, when the vehicle speed of the travelling machine body 2 is lowest, in such a manner as to form an angle inclined to any one of the angles (in this case, an inclination angle is negative and in the neighborhood of the maximum).

When the inclination angle of the pump cam plate 159 is approximately zero (neutral angle), the hydraulic motor unit 151 is not driven by the hydraulic pump unit 150, and a main transmission output shaft 237 rotates at approximately the same rotational speed as that of the main transmission input shaft 27. When the pump cam plate 159 is inclined on the side of one direction (positive inclination angle) with respect to the axis line of the main transmission input shaft 27, the hydraulic pump unit 150 operates the hydraulic motor unit 151 in such a manner as to accelerate, and the main transmission output shaft 36 rotates at a rotational speed higher than that of the main transmission input shaft 27. As a result, the rotational speed of the hydraulic motor unit 151 is added to the rotational speed of the main transmission input shaft 27, which is transmitted to the main transmission output shaft 36. Accordingly, transmission power (vehicle speed) from the main transmission output shaft 36 is changed in proportion to the inclination angle (positive inclination angle) of the pump cam plate 159 in a range of the rotational speed that is higher than the rotational speed of the main transmission input shaft 27. When the inclination angle of the pump cam plate 159 is positive and in the neighborhood of the maximum inclination angle, the vehicle speed of the travelling machine body 2 reaches the maximum.

When the pump cam plate 159 is inclined on the side of the other direction (negative inclination angle) with respect to the axis line of the main transmission input shaft 27, the hydraulic pump unit 150 operates the hydraulic motor unit 151 in such a manner as to decelerate (reversely rotate), and the main transmission output shaft 36 rotates at a rotational speed lower than that of the main transmission input shaft 27. As a result, the rotational speed of the hydraulic motor unit 151 is subtracted from the rotational speed of the main transmission input shaft 27, which is transmitted to the main transmission output shaft 36. Accordingly, the transmission power from the main transmission output shaft 36 is changed in proportion to the inclination angle (negative inclination angle) of the pump cam plate 159 in a range of the rotational speed that is lower than the rotational speed of the main transmission input shaft 27. When the inclination angle of the pump cam plate 159 is negative and in the neighborhood of the maximum inclination angle, the vehicle speed of the travelling machine body 2 reaches the minimum.

The forward/backward switching mechanism 30 receives the rotational power from the main transmission output shaft 36 of the hydraulic continuously variable transmission 29. The forward/backward switching mechanism 30 includes a forward gear (not illustrated) and a backward gear (not illustrated), which are used for switching forward and backward movements of the travelling machine body 2, and the forward gear and the backward gear are alternatively selected and rotated by forward and backward hydraulic clutches (not illustrated), thereby transmitting power to the auxiliary transmission gear mechanism 31. In this time, in a state where a forward/backward switching lever (reverser lever) 252 is at a neutral position, any of the forward and backward hydraulic clutches not illustrated is brought into a state where the power is blocked. It is constituted such that the rotational power transmitted from the main transmission output shaft 36 to the front wheels 3 and the rear wheels 4 becomes approximately zero (in the same state as the disengagement of the main clutch 140).

Also, a forward clutch electromagnetic valve 46 (see FIG. 13) is driven by the forward side tilting operation of the forward/backward switching lever 252 (see FIGS. 1 and 2), thereby actuating a forward clutch cylinder (not illustrated). Accordingly, the rotational power of the main transmission output shaft 36 is transmitted to the auxiliary transmission gear mechanism 31 via the forward gear not illustrated in the forward/backward switching mechanism 30. In contrast, a backward clutch electromagnetic valve 48 (see FIG. 13) is driven by the backward side tilting operation of the forward/backward switching lever 252, thereby actuating a backward clutch cylinder (not illustrated). Accordingly, the rotational power of the main transmission output shaft 36 is transmitted to the auxiliary transmission gear mechanism 31 via the backward gear not illustrated in the forward/backward switching mechanism 30.

The auxiliary transmission gear mechanism 31 receives the rotational power from the forward/backward switching mechanism 30, shifts the rotational power by way of the forward/backward switching mechanism 30, and outputs the power. The auxiliary transmission gear mechanism 31 includes a low-speed gear (not illustrated) and a high-speed gear (not illustrated) for auxiliary transmission, and the low-speed gear and the high-speed gear are alternatively selected and rotated by a low-speed clutch (not illustrated) and a high-speed clutch (not illustrated), thereby shifting the rotational power from the forward/backward switching mechanism 30 and transmitting power to each mechanism in subsequent stages.

Figure 13:
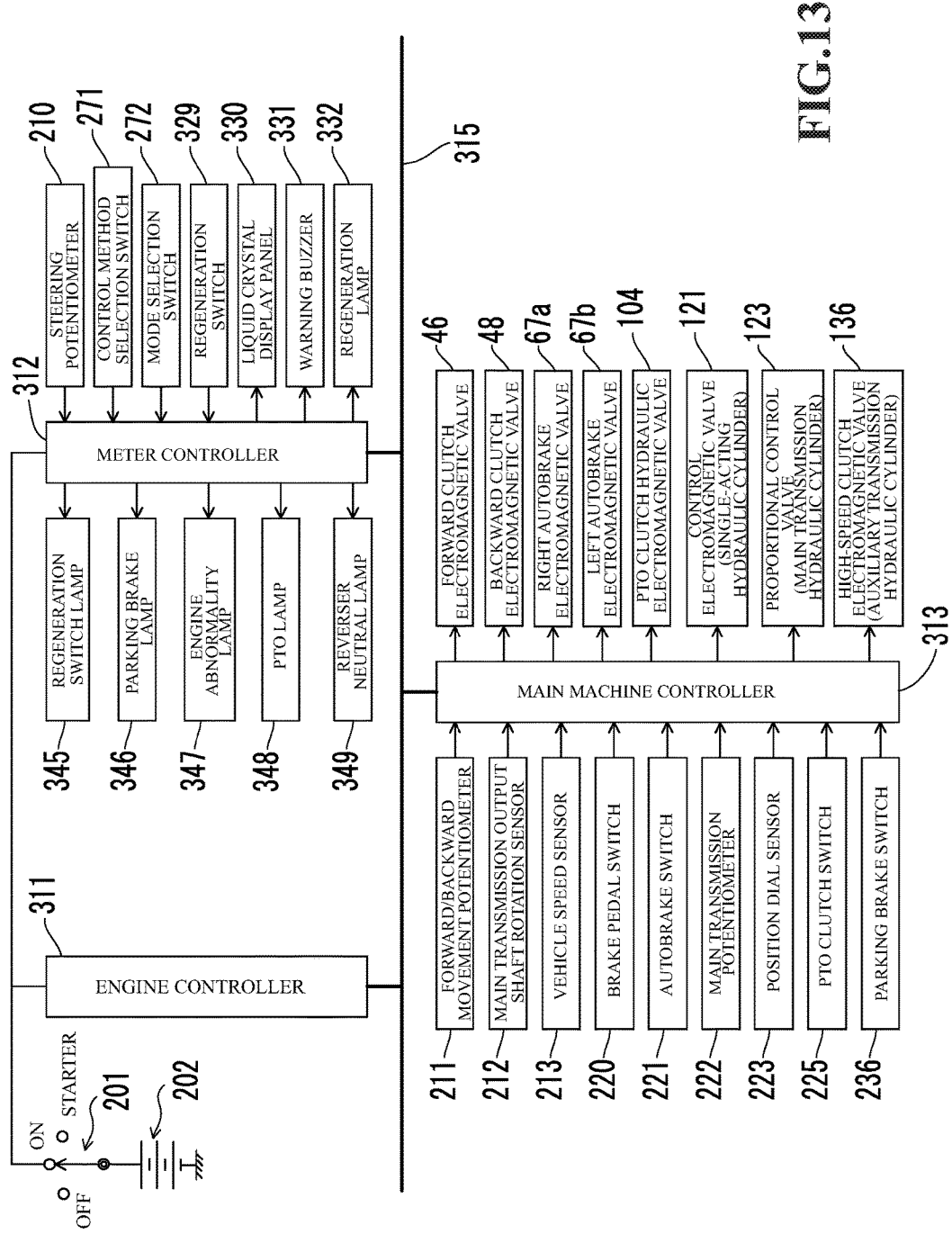
FIG. 13 is a functional block diagram of a controller.

The position of a piston rod of an auxiliary transmission hydraulic cylinder (not illustrated) is displaced on the low-speed side by the low-speed side tilting operation of an auxiliary transmission lever 258 (see FIGS. 1 and 2) in accordance with the switching operation of a high-speed clutch electromagnetic valve 136 (see FIG. 13). Accordingly, an auxiliary transmission shifter (not illustrated) coupled with the tip end of the piston rod of the auxiliary transmission hydraulic cylinder (not illustrated) brings the low-speed clutch not illustrated into a power connection state, shifts the rotational power from the forward/backward switching mechanism 30 to a low speed, and transmits the power to the differential gear mechanism 58.

In contrast, the position of the piston rod of the auxiliary transmission hydraulic cylinder (not illustrated) is displaced on the high-speed side by the high-speed side tilting operation of the auxiliary transmission lever 258 in accordance with the switching operation of the high-speed clutch electromagnetic valve 136 (see FIG. 13). Accordingly, the auxiliary transmission shifter (not illustrated) brings the high-speed clutch not illustrated into a power connection state, shifts the rotational power from the forward/backward switching mechanism 30 to a high speed, and transmits the power to the differential gear mechanism 58.

The differential gear mechanism 58 receives the rotational power from the auxiliary transmission gear mechanism 31 and transmits the transmission power, shifted by the auxiliary transmission gear mechanism 31, to the right and left rear wheels 4. In this time, the differential gear mechanism 58 allocates and transmits the transmission power, shifted by the auxiliary transmission gear mechanism 31, to differential output shafts 62 extended in the right and left directions by means of differential gears (not illustrated) (differential operation). Then, the differential output shafts 62 are coupled with rear axles 64 via a final gear 63 and the like, and the rear wheels 4 are mounted on the tip end portions of the rear axles 64. Also, brake actuating mechanisms 65a and 65b are provided in association with the differential output shafts 62, and it is constituted such that the brake actuating mechanisms 65a and 65b are damped by the depressing operation of a brake pedal 251 (see FIG. 2) disposed on the right side of a steering column 245.

Furthermore, when the steering angle of the steering handle 9 (see FIGS. 1 and 2) forms a predetermined angle or larger, it is constituted such that a brake cylinder (not illustrated) is actuated by the drive of an autobrake electromagnetic valve 67a (67b) corresponding to the rear wheels 4 on the inner side during rotation, and the brake actuating mechanism 65a (65b) corresponding to the rear wheels 4 on the inner side during rotation is automatically damped. Accordingly, this makes it possible to making sharp turns such as a U-turn in travelling rotationally. Also, the differential gear mechanism 58 includes a differential lock mechanism (not illustrated) for stopping the aforementioned differential operation (driving the right and left differential output shafts 62 with uniform velocity at all times). In this case, it is constituted such that a lock pin provided in a freely insertable manner is engaged with the differential gear by the depressing operation of a differential lock pedal 257 (see FIG. 2), which causes the differential gear to be fixed, stops a differential function, and drivingly rotates the right and left differential output shafts 62 with uniform velocity.

Also, the mission case 17 having the aforementioned constitution includes a PTO transmission gear mechanism (not illustrated) for switching the driving speed of the PTO shaft 23 and a PTO clutch (not illustrated) for engaging and disengaging the transmission of power between the main transmission input shaft 27 and the PTO transmission gear mechanism, in the interior thereof. The power from the engine 5 is transmitted to the PTO shaft 23 by the operations of the PTO transmission gear mechanism and the PTO clutch.

In this case, when a PTO clutch switch 225 described later is operated and engaged, the PTO clutch not illustrated is brought into a power connection state by the drive of a PTO clutch hydraulic electromagnetic valve 104 (see FIG. 13). As a result, the rotational power from the engine 5, which is transmitted through the main transmission input shaft 27, is outputted from the PTO gear mechanism not illustrated to the PTO shaft 23. In this time, when a PTO transmission lever 256 is shifted, a plurality of gears in the PTO transmission gear mechanism not illustrated are alternatively rotated and operated, thereby transmitting each PTO transmission output, at the first to fourth speeds and reverse rotation, to the PTO shaft 23.

The maneuvering seat 8 and its peripheral structure will be described referring to FIGS. 4 to 6. The steering column 245 is arranged in front of the maneuvering seat 8 in the cabin 7. The steering column 245 is vertically installed in such a manner as to be buried on the rear surface side of a dashboard 263 that surrounds the rear portion side of the engine 5. The steering handle 9, which is formed in an approximately circular shape when viewed from a plane, is mounted on the upper end of a handle shaft protruded from the upper surface of the steering column 245. Accordingly, an approximately annular steering wheel 247 of the steering handle 9 is positioned in such a manner as to be inclined obliquely downward in the rear with respect to the horizontal direction.

A throttle lever 250 for setting and holding the number of output revolutions of the engine 5 and a pair of right and left brake pedals 251 for damping and operating the travelling machine body 2 are arranged on the right side of the steering column 245. The forward/backward switching lever (reverser lever) 252 for switching the advancing direction of the travelling machine body 2 to the forward or backward direction and a clutch pedal 253 for actuating the disengagement of the main clutch 140 for power engagement and disengagement are arranged on the left side of the steering column 245. A parking brake lever 254 for holding the right and left brake pedals 251 at depressing positions is arranged on the rear surface side of the steering column 245.

An accelerator pedal 255 for accelerating and decelerating the engine revolutions, in a range that is equal to or wider than a range where the engine revolutions set by the throttle lever 250 are the minimum revolutions, is arranged on the right side of the steering column 245 on the base plate 248 in the cabin 7. The PTO transmission lever 256 for performing switching operation of the driving speed of the PTO shaft 23 described later and the differential lock pedal 257 for executing the operation of drivingly rotating the right and left rear wheels 4 with constant velocity are arranged below the maneuvering seat 8. The auxiliary transmission lever 258 for switching the output range of the travelling auxiliary transmission gear mechanism 31 (see FIG. 3) to the low speed and high speed is arranged on the left side of the maneuvering seat 8.

An arm rest 259 for placing the arm or elbow of the operator who sits on the maneuvering seat 8 is provided on the right side of the maneuvering seat 8. The arm rest 259 is constituted as an individual body separated from the maneuvering seat 8 and includes the main transmission lever 290 as a travelling operating means and a work portion position dial (hoisting and lowering dial) 300 as a work operating means. The main transmission lever 290 is provided so as to be capable of performing forward and backward tiling operations as a main transmission operating body. Then, in the present embodiment, when the main transmission lever 290 is operated in such a manner as to be tilted forward, the vehicle speed of the travelling machine body 2 increases, whereas when the main transmission lever 290 is operated in such a manner as to be tilted backward, the vehicle speed of the travelling machine body 2 decreases. The work portion position dial 300 is of a dial type for manually changing and adjusting the height position of the rotary cultivator 15.

When the main transmission lever 290 is tilted to the front side (the side of the steering handle 9), the pump cam plate 159 (see FIG. 3) is tilted to a positive inclination angle side in accordance with the operating position of the main transmission lever 290, which is detected by a main transmission potentiometer 222, thereby accelerating the travelling speed of the travelling machine body 2. In contrast, when the main transmission lever 290 is tilted to the rear side (the side of the maneuvering seat 8), the pump cam plate 159 (see FIG. 3) is tilted to a negative inclination angle side in accordance with the operating position of the main transmission lever 290, which is detected by the main transmission potentiometer 222, thereby decelerating the travelling speed of the travelling machine body 2.

An operating stand 260 on which various operating means are provided is fixed above the fender 19 on the right side of the arm rest 259, and the PTO clutch switch 225 is arranged on the upper surface of the operating stand 260. The PTO clutch switch 225 is used to engage or disengage a PTO clutch (not illustrated) and perform the engaging/disengaging operation of the transmission of power from the PTO shaft 23 to the rotary cultivator 15. The PTO clutch switch 225 is a push switch, and when the switch is turned clockwise in a plane view while being pressed down once, the switch is locked at a position where the switch is pressed down and brings the transmission of power from the PTO shaft 23 to the rotary cultivator 15 into a connection state, and when the switch is further pressed down once, the switch is returned to its original position and brings the transmission of power from the PTO shaft 23 to the rotary cultivator 15 into a cut-off state.

Figure 4:
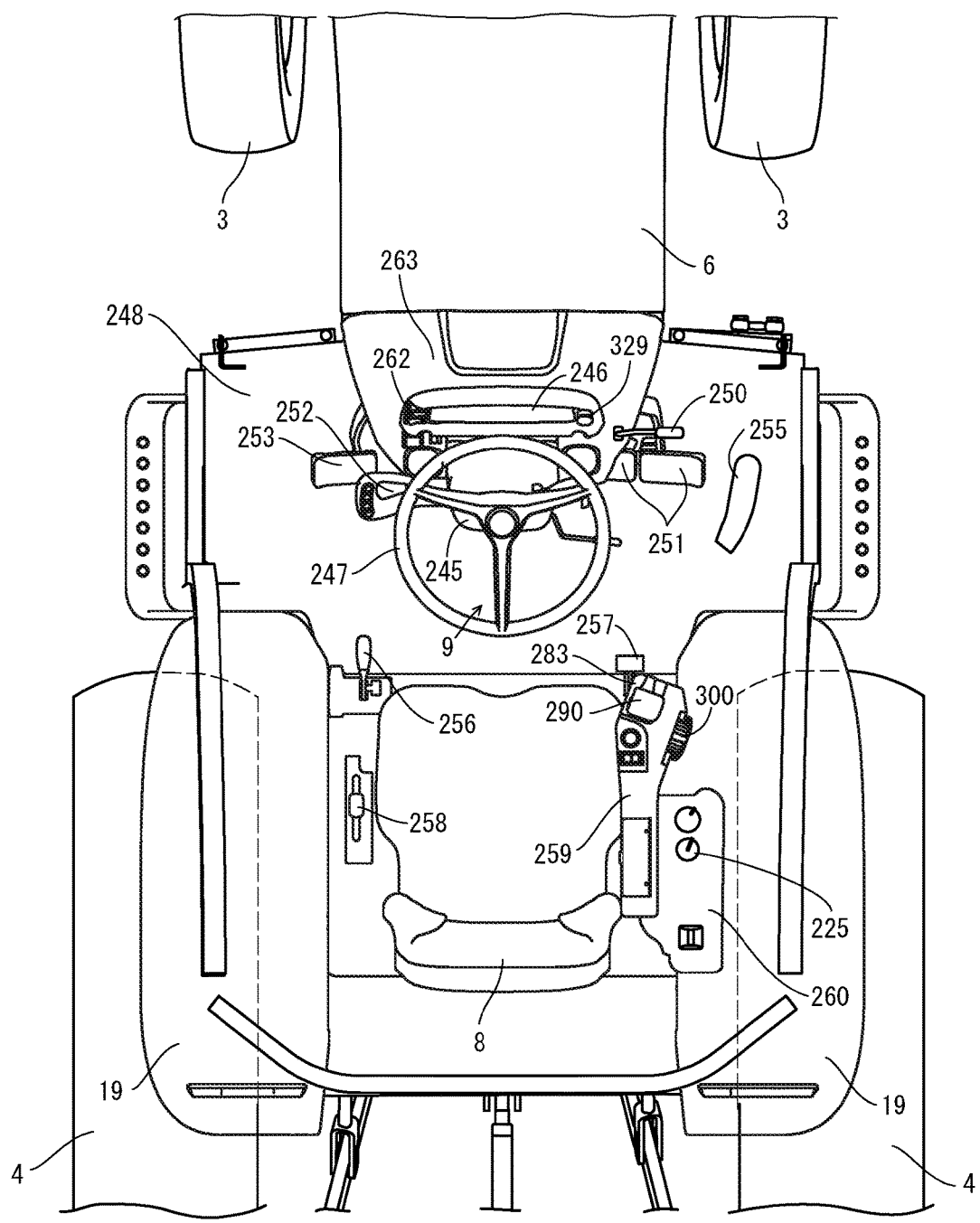
FIG. 4 is a plan view of a cabin.
Figure 6:
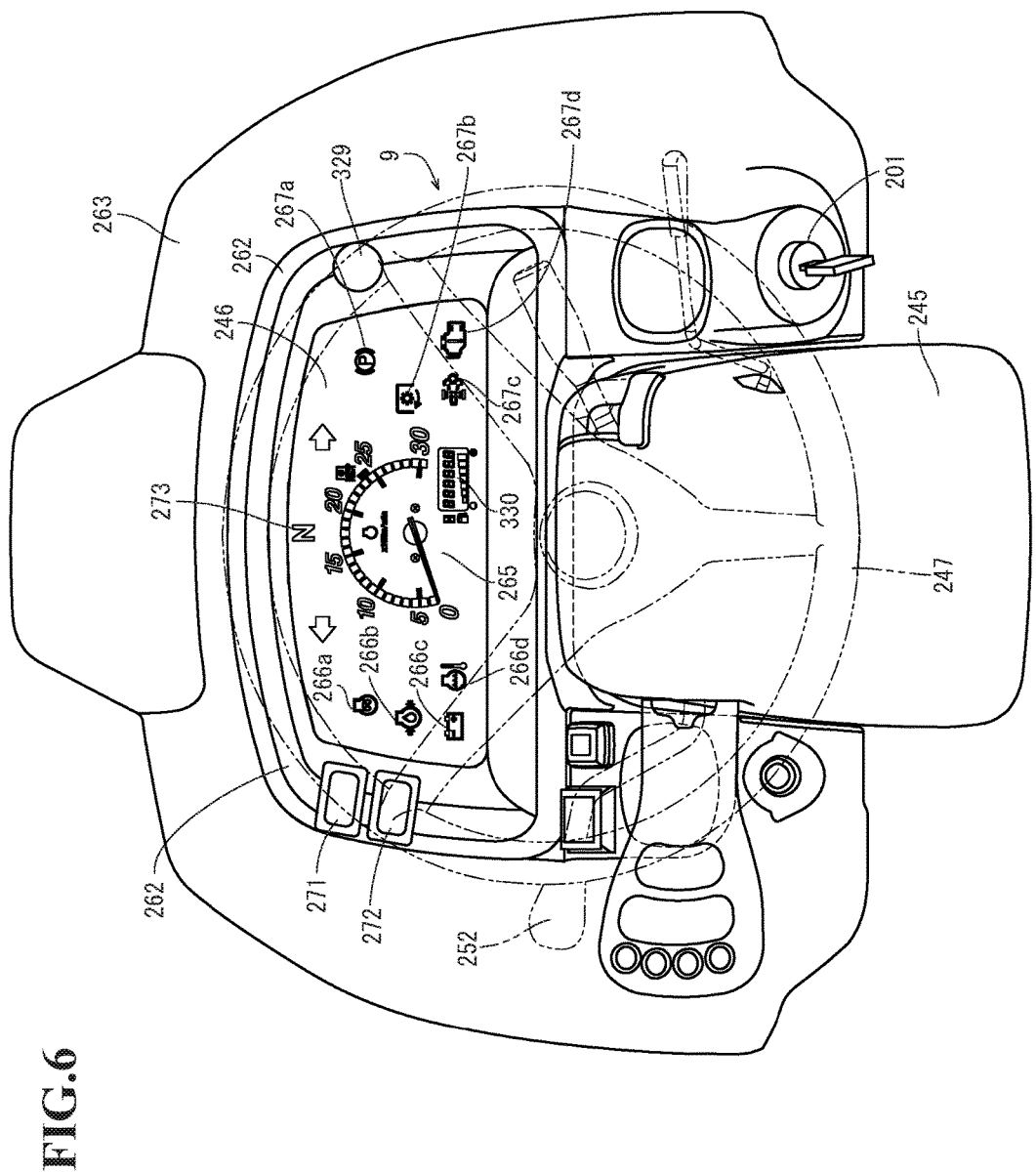
FIG. 6 is a front view of a meter panel viewed from the side of a maneuvering seat.
Figure 7:
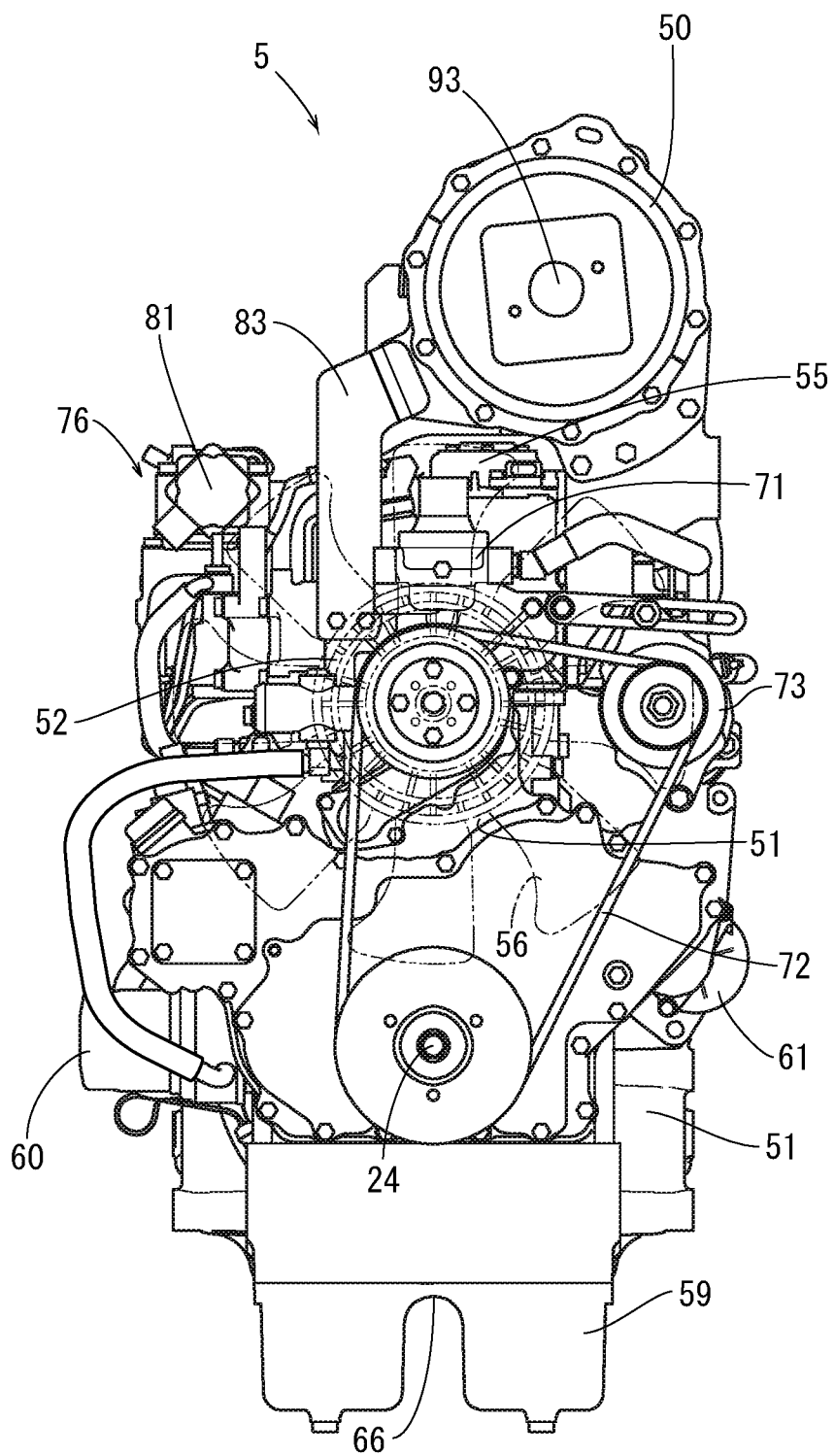
FIG. 7 is a front view of an engine of an embodiment.
Figure 8:
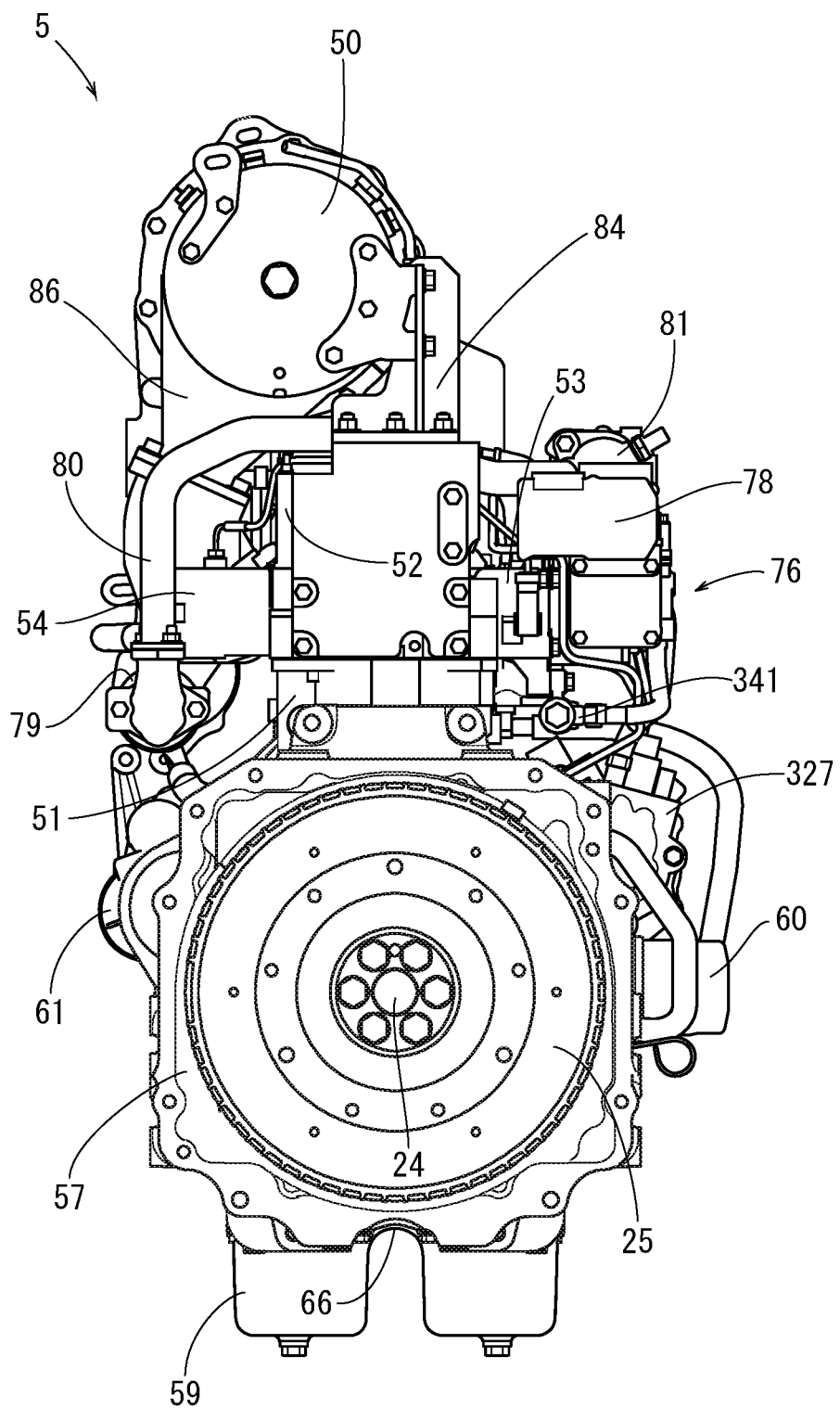
FIG. 8 is a back view of the engine.
Figure 9:
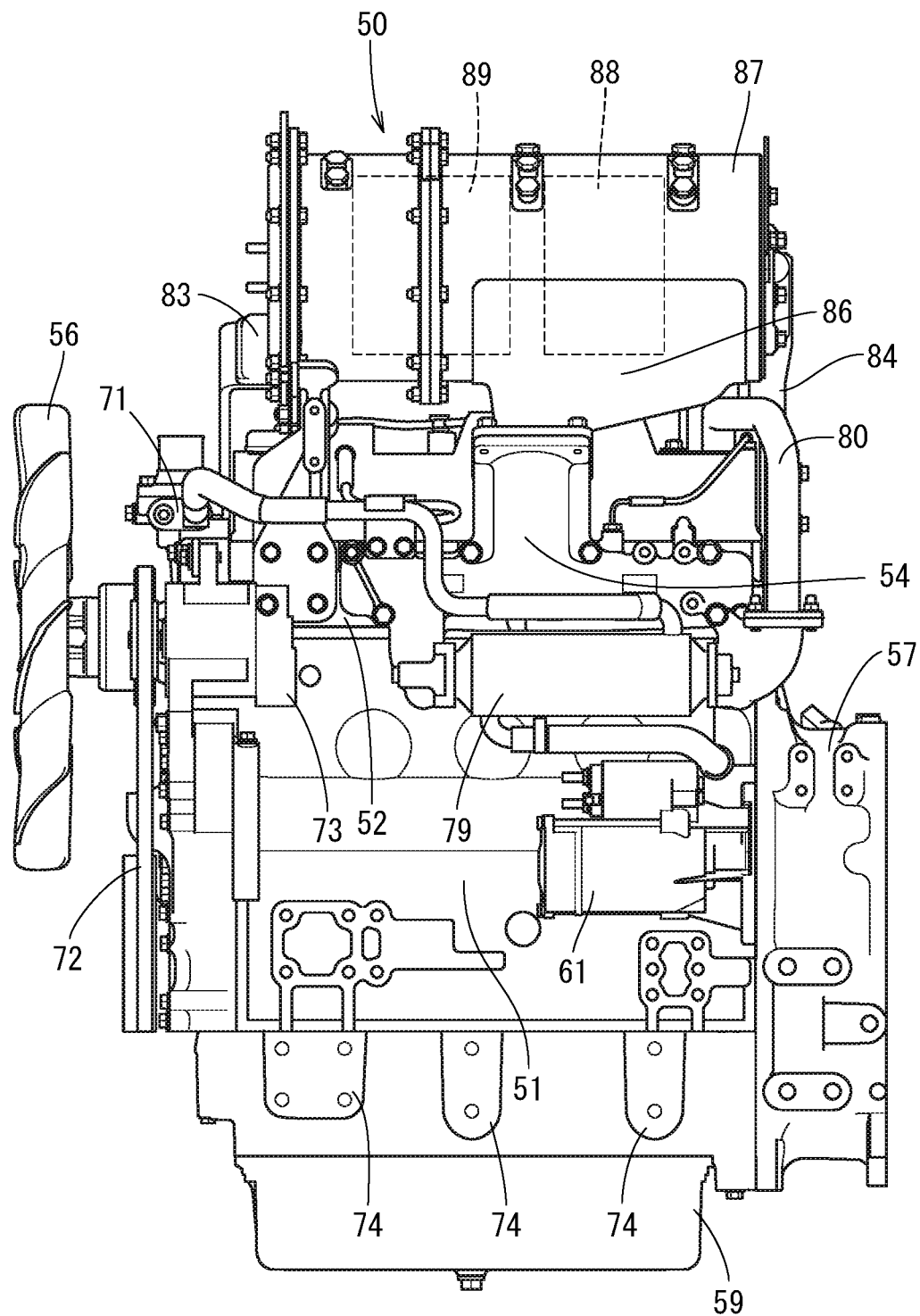
FIG. 9 is a left side view of the engine.

As illustrated in FIGS. 4 to 6, a meter panel 246 is arranged at a position on the lower side in front of the steering wheel 247 in such a manner as to face the operator who sits on the maneuvering seat 8 in a state where the surface of the panel is inclined slightly upward from the rear. Also, the outer edge of the meter panel 246 is covered with a meter cover 262 raised from the inner side to the outer side. Then, the meter panel 246 covered with the meter cover 262 is arranged on the surface (rear surface) in back of the dashboard 263 of the upper portion in front of the steering column 245. The dashboard 263 constitutes a maneuvering column along with the steering column 245.

The meter panel 246 as an driving operation display device, as illustrated in FIG. 6, includes an engine tachometer 265 for indicating the revolutions of the engine 5 with a pointer in the central display area thereof and includes display lamps 266a to 266d and 267a to 267d made up of LEDs and the like in the display areas on the outer sides (the outer side of the central display area) of the right and left of the engine tachometer 265. The meter panel 246 having the aforementioned constitution actuates the display lamps 266a to 266d and 267a to 267d as a warning light for indicating abnormality of each portion of the tractor 1 or a display light for indicating the travelling state of the tractor 1 or the operating state of the rotary cultivator 15, or the like.

In the example of the constitution in FIG. 6, in the right side display area of the meter panel 246, the display lamps 267a to 267d respectively act as a parking brake lamp 346 (see FIG. 13) for notifying the lock state of the parking brake lever 254, a PTO lamp 348 (see FIG. 13) for notifying an on state of the PTO clutch switch 225, a regeneration lamp 332 (see FIG. 13) for notifying a regeneration control request warning, and an engine abnormality lamp 347 (see FIG. 13) for notifying the abnormality of the engine 5. Also, the meter panel 246 includes a liquid crystal display panel 330 described later on the lower side of the engine tachometer 265.

Also, in the central display area of the meter panel 246, a display lamp 273 such as LEDs is provided in the display area on the upper side of the engine tachometer 265. The display lamp 273 is formed in a letter of "N" on the meter panel 246 and acts as a reverser neutral lamp 349 (see FIG. 13) for notifying the neutral state of the forward/backward switching lever 252.

A control method selection switch 271 and a mode selection switch 272 are arranged on the left side surface of the backward rear surface of the meter cover 262. The control method selection switch 271 and the mode selection switch 272 both are of an alternate operation type. The control method selection switch 271 designates any of droop control or isochronous control as the control method of the engine 5 based on the operation of the operator. The mode selection switch 272 designates the advisability of a high idle limit operation in which the high idle rotational speed (a rotational speed, which is the maximum limit when load is not applied) of the engine 5 is limited based on predetermined revolutions (a limiting value) Nh (for example, 1800 rpm), based on the operation of the operator.

A regeneration switch 329 is installed on the surface on the right side on the backward rear surface of the meter cover 262. The regeneration switch 329 is of a momentary operation type. That is, the regeneration switch 329 is a push switch of a non-rock type, which outputs one ON pulse signal when the switch is pressed down once. The duration during which the operator holds the regeneration switch 329 pressed down is adopted as one of standards for determining whether or not each regeneration control after reset regeneration control (described later in detail) can be executed. The regeneration switch 329 of the embodiment is constituted of a switch equipped with a lamp, wherein a regeneration switch lamp 345 is incorporated. The regeneration switch 329 is arranged in the vicinity of the meter panel 246 that displays a regeneration request warning described later by means of the display lamp 267*a*, so that the operator can perform the operation of the regeneration switch 329 in a state of visually recognizing the display of the meter panel 246.

Also, in the embodiment, the regeneration switch 329 is arranged in the vicinity of the display lamp 267*a* of the meter panel 246, which acts as the regeneration lamp 332 (see FIG. 13). That is, the regeneration switch 329 is arranged in the vicinity of the display area of the regeneration control request warning in the meter panel 246, which serves as the driving operation display portion. Accordingly, when the regeneration request warning is notified by the display of the display lamp 267*a*, the operator can easily recognize the operating position of the regeneration switch 329.

Furthermore, in the embodiment, in the display area on the right side of the meter panel 246, the regeneration lamp 332 as the display lamp 267*c* flickers, so that the operator recognize the notification of the regeneration request warning and concurrently easily recognizes the operating position of the regeneration switch 329. Also, the display lamps 267*d* as the engine abnormality lamp 347 is arranged on the right side of the display lamps 267*c* as the regeneration lamp 332, as described later, so that the operator can easily determine whether the regeneration control to be required is the reset regeneration control or the non-work regeneration control, based on the flickering operation of the display lamps 267*c* and 267*d*.

Furthermore, the display lamps 267*a* and 267*b* as the parking brake lamp 346 and the PTO lamp 348 are arranged on the display area on the right side, which is the vicinity of the display lamps 267*c* as the regeneration lamp 332, as described later, so that the operator can easily recognize that any of the non-work regeneration transfer conditions is not satisfied during the request of the non-work regeneration control, based on the flickering operation of the display lamps 267*a* and 267*b*. It is noted that the display lamps 267*a* to 267*d* are not limited to the constituent example in FIG. 6, another constitution may be applied as long as the regeneration lamp 332, the parking brake lamp 346, the engine abnormality lamp 347, and the PTO lamp 348 are combined at an adjacent position and arranged in the display area of the meter panel 246.

Next, the schematic structure of the common-rail diesel engine 5 of the embodiment will be described referring to FIGS. 7 to 11. It is noted that, in the description below, the bilateral portions along the engine output shaft 24 (the bilateral portions between which the engine output shaft 24 is sandwiched) are referred to as "right-and-left", and the installation side of a cooling fan 56 is referred to as "front side", and the installation side of the flywheel 25 is referred to as "rear side", and the installation side of an exhaust manifold 54 is referred to as "left side", and the installation side of an intake manifold 53 is referred to as "right side", which serves as references in terms of positional relations in the four directions and the up-and-down direction of the engine 5 for convenience' sake.

As illustrated in FIGS. 7 to 11, the engine 5 mounted on the work vehicle such as the tractor, as a power engine, includes a continuously regenerating exhaust gas purification device 50 (DPF). The particulate matter (PM) in the exhaust gas emitted from the engine 5 is removed by the exhaust gas purification device 50, and carbon monoxide (CO) or hydrogen carbon (HC) in the exhaust gas is reduced.

The engine 5 includes a cylinder block 51 in which the engine output shaft 24 (crankshaft) and pistons (not illustrated) are incorporated. A cylinder head 52 is mounted on the cylinder block 51. The intake manifold 53 is arranged on the right side surface of the cylinder head 52. The exhaust manifold 54 is arranged on the left side surface of the cylinder head 52. That is, the intake manifold 53 and the exhaust manifold 54 are allocated and arranged on the bilateral surfaces along the engine output shaft 24 in the engine 5. A head cover 55 is arranged on the upper surface of the cylinder head 52. The cooling fan 56 is provided on one side surface intersecting with the engine output shaft 24 in the engine 5, specifically, on the front surface of the cylinder block 51. The rotational power is transmitted from the front end side of the engine output shaft 24 to the cooling fan 56 via a V belt 72.

A flywheel housing 57 is provided on the rear surface of the cylinder block 51. The flywheel 25 is arranged in the flywheel housing 57. The flywheel 25 is pivotally supported on the rear end side of the output shaft 24. It is configured such that the power of the engine 5 is taken out to the work portion of the work vehicle 1 via the engine output shaft 24. Also, an oil pan 59 is arranged on the lower surface of the cylinder block 51. Lubricating oil in the oil pan 59 is supplied to each lubricating portion of the engine 5 via an oil filter 60 arranged on the right side surface of the cylinder block 51.

A fuel supply pump 327 for supplying fuel is mounted above the oil filter 60 (below the intake manifold 53) on the right side surface of the cylinder block 51. Injectors 340 equipped with a fuel injection valve 328 (see FIG. 14) of an electromagnetic opening/closing control type, are provided in the engine 5. Each injector 340 is connected to a fuel tank 344 (see FIG. 14) mounted on the work vehicle via the fuel supply pump 327, a cylindrical common rail 341, and a fuel filter 343 (see FIG. 14).

The fuel in the fuel tank 344 is pressure-fed from the fuel supply pump 327 to the common rail 341 via the fuel filter 343, and high-pressure fuel is accumulated in the common rail 341. The fuel injection valve 328 of each injector 340 is controlled in such a manner as to be opened and closed, and the high-pressure fuel in the common rail 341 is injected from each injector 340 to each cylinder of the engine 5. It is noted that a starter 61 for starting the engine is provided in the flywheel housing 57. The pinion gear of the starter 61 for starting the engine is meshed with a ring gear of the flywheel 25. When the engine 5 is started, the ring gear of the flywheel 25 is rotated by the rotational force of the starter 61, which causes the engine output shaft 24 to start rotating (what is called cranking is executed).

A coolant pump 71 is arranged coaxially with the fan shaft of the cooling fan 56 on the front surface side (the side of the cooling fan 56) of the cylinder head 52. As a generator, an alternator 73 that generates electricity by use of the power of the engine 5 is provided on the left side of the engine 5, specifically, on the left side of the coolant pump 71. The rotational power is transmitted from the front end side of the engine output shaft 24 to the cooling fan 56, the coolant pump 71, and the alternator 73 via the V belt 72. The coolant in a radiator 109 (see FIG. 12) mounted on the work vehicle is supplied to the cylinder block 51 and the cylinder head 52 by means of the drive of the coolant pump 71, thereby cooling the engine 5.

Engine leg mounting units 74 are respectively provided on the right and left side surfaces of the oil pan 59. In each engine leg mounting unit 74, an engine leg body (not illustrated) that includes a vibration-proof rubber can be fastened with bolts. In the embodiment, the oil pan 59 is clamped with a pair of right and left engine frames of the work vehicle, and the engine leg mounting unit 74 on the side of the oil pan 59 is fastened with bolts to each engine frame 14, so that the both engine frames 14 of the work vehicle 1 support the engine 5. The oil pan 59 includes a grooved depression 66 disposed in parallel to the engine output shaft 24 in the center of the bottom surface thereof. The front wheel driving shaft 85 of the work vehicle 1 is inserted into the depression 66 of the oil pan 59 and coupled with the front wheel axle case (see FIG. 1).

Figure 10:
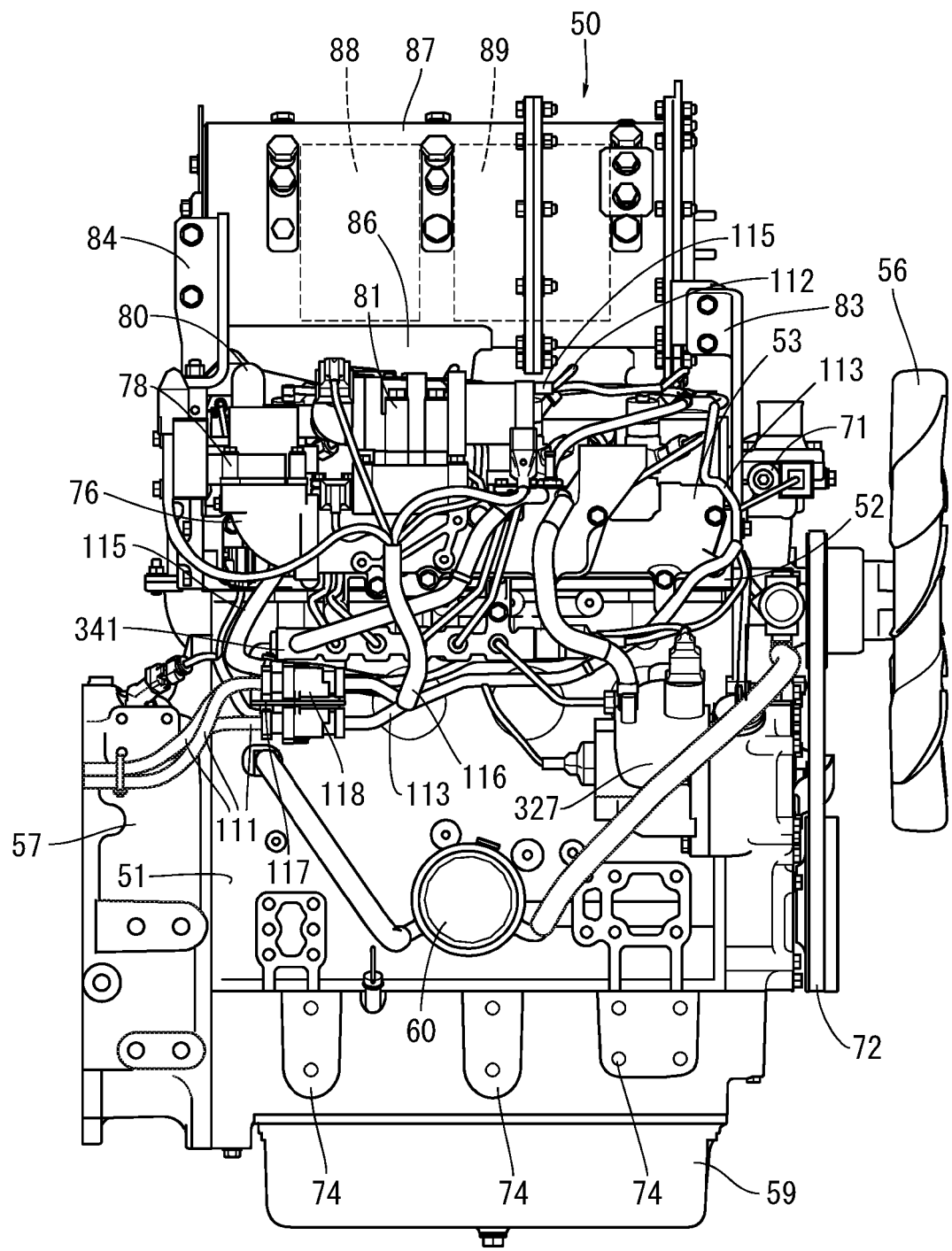
FIG. 10 is a right side view of the engine.
Figure 11:
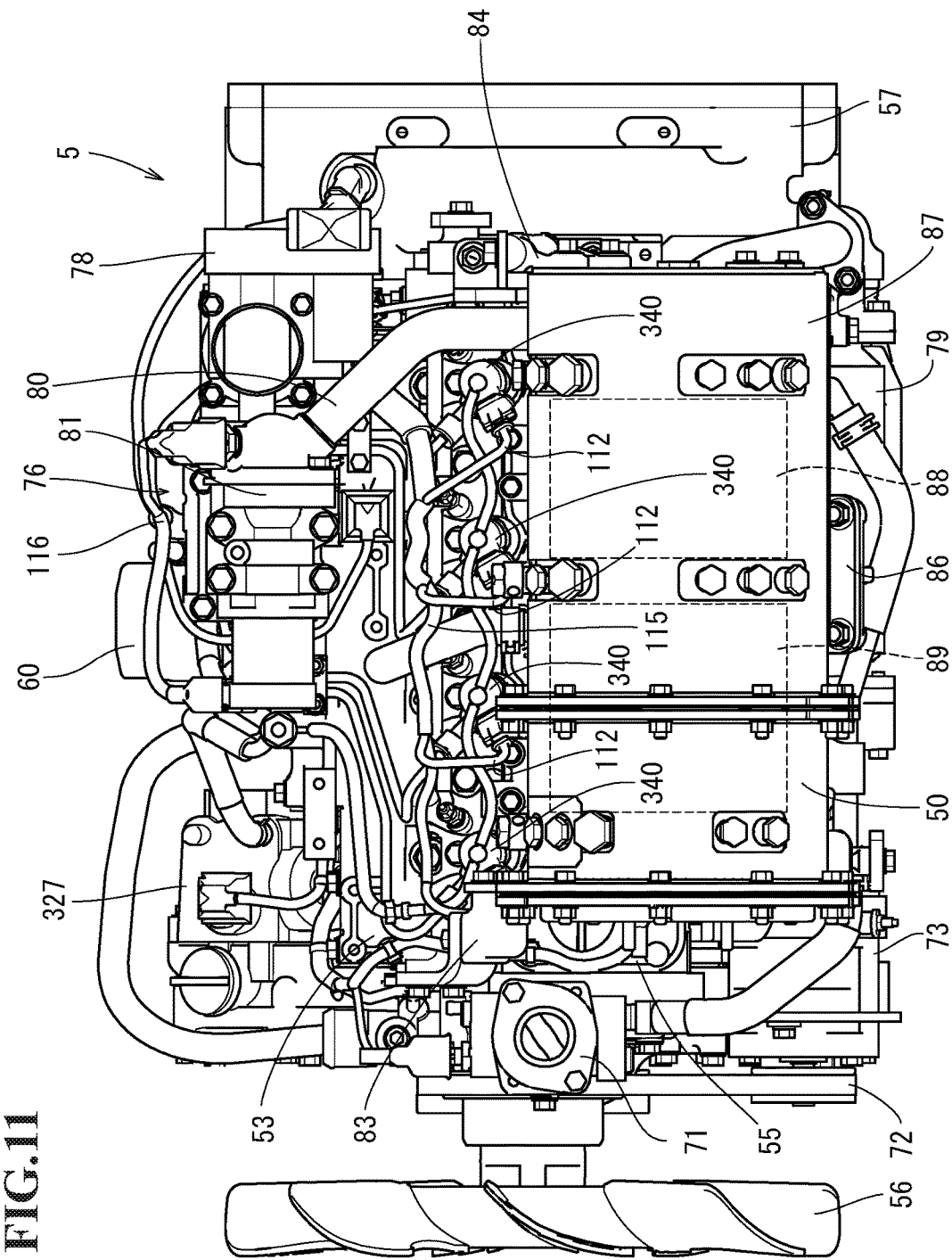
FIG. 11 is a plan view of the engine.

As illustrated in FIGS. 10 and 11, an air cleaner 145 is coupled with the inlet port of the intake manifold 53 via an EGR device 76 (exhaust gas recirculation device). The EGR device 76 is mainly positioned on the right side of the engine 5, specifically, the right side of the cylinder head 52. After fresh air (outside air) drawn in by the air cleaner 145 is purified by removing dust by means of the air cleaner 145, the fresh air is delivered to the intake manifold 53 via the EGR device 76 and supplied to each cylinder of the engine 5.

The EGR device 76 includes an EGR main body case that mixes the part of the exhaust gas (EGR gas) of the engine 5 with the fresh air and supplies the mixed air to the intake manifold 53, an intake throttle member 78 through which the EGR main body case communicates with the air cleaner 145, a recirculation exhaust gas pipe 80 connected to the exhaust manifold 54 via an EGR cooler 79, and an EGR valve member 81 through which the EGR main body case communicates with the recirculation exhaust gas pipe 80. In the embodiment, the air intake side of the intake manifold 53 constitutes the EGR main body case.

That is, the intake throttle member 78 is coupled with the air intake side of the intake manifold 53. Also, the outlet side of the recirculation exhaust gas pipe 80 is connected to the air intake side of the intake manifold 53. The inlet side of the recirculation exhaust gas pipe 80 is connected to the exhaust manifold 54 via the EGR cooler 79. The opening degree of the EGR valve disposed in the EGR valve member 81 is adjusted, thereby adjusting the amount of EGR gas supplied to the air intake side of the intake manifold 53.

With the aforementioned constitution, the fresh air is supplied from the air cleaner 145 into the air intake side of the intake manifold 53 via the intake throttle member 78, whereas the EGR gas is supplied from the exhaust manifold 54 into the air intake side of the intake manifold 53. The fresh air from the air cleaner 145 and the EGR gas from the exhaust manifold 54 are mixed in the air intake side of the intake manifold 53. Part of the exhaust gas discharged from the engine 5 to the exhaust manifold 54 is returned from the intake manifold 53 to the engine 5, so that the maximum combustion temperature during high-load operations is reduced, and the emissions of NOx (nitride oxides) discharged from the engine 5 are reduced.

The exhaust gas purification device 50 is arranged above the exhaust manifold 54 on the upper surface side of the engine 5, that is, above the exhaust manifold 54 on the left side of the cylinder head 52. The exhaust gas purification device 50 collects the particulate matter (PM) and the like in the exhaust gas and is constituted in an approximately cylindrical shape elongated in the right-and-left direction in parallel to the output shaft (crankshaft) 24 of the engine 5. An exhaust gas inlet pipe 86 and an exhaust gas outlet 93 are allocated to the right and left of the engine 5 and provided on bilateral sides (the upstream side and the downstream side of the transfer direction of the exhaust gas) of the right and left of the exhaust gas purification device 50. The exhaust gas inlet pipe 86, which is on the exhaust gas intake side of the exhaust gas purification device 50, is detachably fastened with bolts to the exhaust manifold 54.

The structure of the exhaust gas purification device 50 will be described. The exhaust gas purification device 50 includes a purification housing 87 that includes the exhaust gas inlet pipe 86. In the interior of the purification housing 87, a diesel oxidation catalyst 88 such as platinum that generates nitrogen dioxide ($NO_2$), and a soot filter 89 having honeycomb structure, in which the particulate matter (PM) collected is consecutively oxidized and removed at a relatively low temperature, are placed in series in the transfer direction of the exhaust gas. The diesel oxidation catalyst 88 and the soot filter 89 are stored in the purification housing 87. It is noted that the exhaust gas outlet 93 of the purification housing 87 is coupled, for example, to a silencer or a tail pipe via an exhaust pipe, and the exhaust gas is discharged from the exhaust gas outlet 93 to the outside via the silencer or the tail pipe.

The purification housing 87 is mounted on the cylinder head 52 and the exhaust manifold 54 via a flange side bracket leg 83 and a casing side bracket leg 84 as the support bodies. The base end side of the flange side bracket leg 83 is detachably fastened with bolts to a joining flange disposed on the outer circumferential side of the purification housing 87. Also, the base end side of the casing side bracket leg 84 is detachably fastened with bolts to the outer lid body of the purification housing 87. The tip end side of the flange side bracket leg 83 is detachably fastened with bolts to a lateral surface on the side of the cooling fan 56 of the cylinder head 52. The tip end side of the casing side bracket leg 84 is detachably fastened with bolts to a lateral surface on the side of the flywheel housing 57 of the cylinder head 52.

An inlet flange body of the exhaust gas inlet pipe 86 is fastened with the outlet portion of the exhaust manifold 54, and the purification housing 87 is communicated and connected with the exhaust manifold 54 via the exhaust gas inlet pipe 86. As a result, the purification housing 87 is coupled and stably supported on the exhaust manifold 54 and the cylinder head 52, which are the high rigidity components of the engine 5, by means of the bracket legs 83 and 84. Accordingly, the damage of the exhaust gas purification device 50 due to vibration or the like can be suppressed.

With the aforementioned constitution, the nitrogen dioxide ($NO_2$) generated by the oxidation action of the diesel oxidation catalyst 88 is taken into the soot filter 89. The particulate matter included in the exhaust gas of the engine 5 is collected by the soot filter 89, consecutively oxidized, and removed by the nitrogen dioxide ($NO_2$). In addition to the removal of the particulate matter (PM) included in the exhaust gas of the engine 5, the content of carbon monoxide (CO) or hydrogen carbon (HC) in the exhaust gas of the engine 5 is reduced.

A plurality of engine actuation sensor power supply system harnesses 111 connected to an engine controller 311 (see FIG. 12) or a battery 202 (see FIG. 12), a plurality of common rail power supply system harnesses 112 connected to the fuel injection valve 328, and a plurality of engine actuation sensor signal system harnesses 113 connected to an actuation sensor (not illustrated) provided on each portion of the engine 5 are included. The harnesses 111, 112, and 113 are respectively consolidated en masse as a plurality of harness aggregate bodies 114, 115, and 116 attached to the engine 5.

With the aforementioned constitution, the common rail power supply system harnesses 112 and the engine actuation sensor signal system harnesses 113 are divided based on the functions, thereby suppressing the weight of one piece of harness (the harness aggregate bodies 114, 115, and 116), so that degree of freedom in the layout of the harness aggregate bodies 114, 115, and 116 is enhanced. Also, the harness aggregate bodies 114, 115, and 116 are respectively replaced for each body, so that harnesses except for the common rail power supply system harnesses can be commonly used with the engine 5 having the different number of cylinders, such as a three cylinder engine and a four cylinder engine.

A connector bracket 117 is fixed on the lateral surface between the common rail 341 and the oil filter 60, on the lateral surface of the cylinder block 51, and plural sets of harness connectors 118 are detachably fixed and supported with the connector bracket 117. The common rail power supply system harnesses 112, the engine actuation sensor signal system harnesses 113, and exhaust gas purification device signal system harnesses (not illustrated) are electrically connected to five sets of engine actuation sensor power supply system harnesses 111 via five sets of harness connectors 118. That is, the common rail power supply system harnesses 112 are connected to the engine actuation sensor power supply system harness 111 via a set of harness connectors 118. Also, the engine actuation sensor signal system harnesses 113 are connected to the engine actuation sensor power supply system harnesses 111 via three sets of harness connectors 118. Also, the exhaust gas purification device signal system harness (not illustrated) is connected to the engine actuation sensor power supply system harness 111 via a set of harness connectors 118. The plurality of exhaust gas purification device signal system harnesses are connected to a DPF temperature sensor 326 (see FIG. 13) and a differential pressure sensor 325.

Also, as illustrated in FIG. 10, the harness aggregate body 115 (the common rail power supply system harnesses 112) and the harness aggregate body 116 (the engine actuation sensor signal system harnesses 113) are respectively extended on the outer circumferential side of the intake manifold 53 and the common rail 341. In contrast, the common rail 341 is arranged below the intake manifold 53, and the harness connectors 118 are assembled below the common rail 341. The harnesses 112 and 113 are separated at constant intervals apart from the outer lateral surface of the engine 5, while the harnesses 112 and 113 are installed along the outer lateral surface of the engine 5. The harnesses 112 and 113 can be prevented from protruding by a large extent from the outer lateral surface of the engine 5. Also, the harness connectors 118 are installed on the cooling wind path of the engine 5, which is formed between the common rail 341 and the oil filter 60. The outer side of the harness connectors 118 is protected with the oil filter 60. For example, the occurrence of a malfunction, which is attributed to the contact between a tool and the harness connectors 118 during the maintenance work of the engine 5 and the like, can be reduced.

Figure 12:
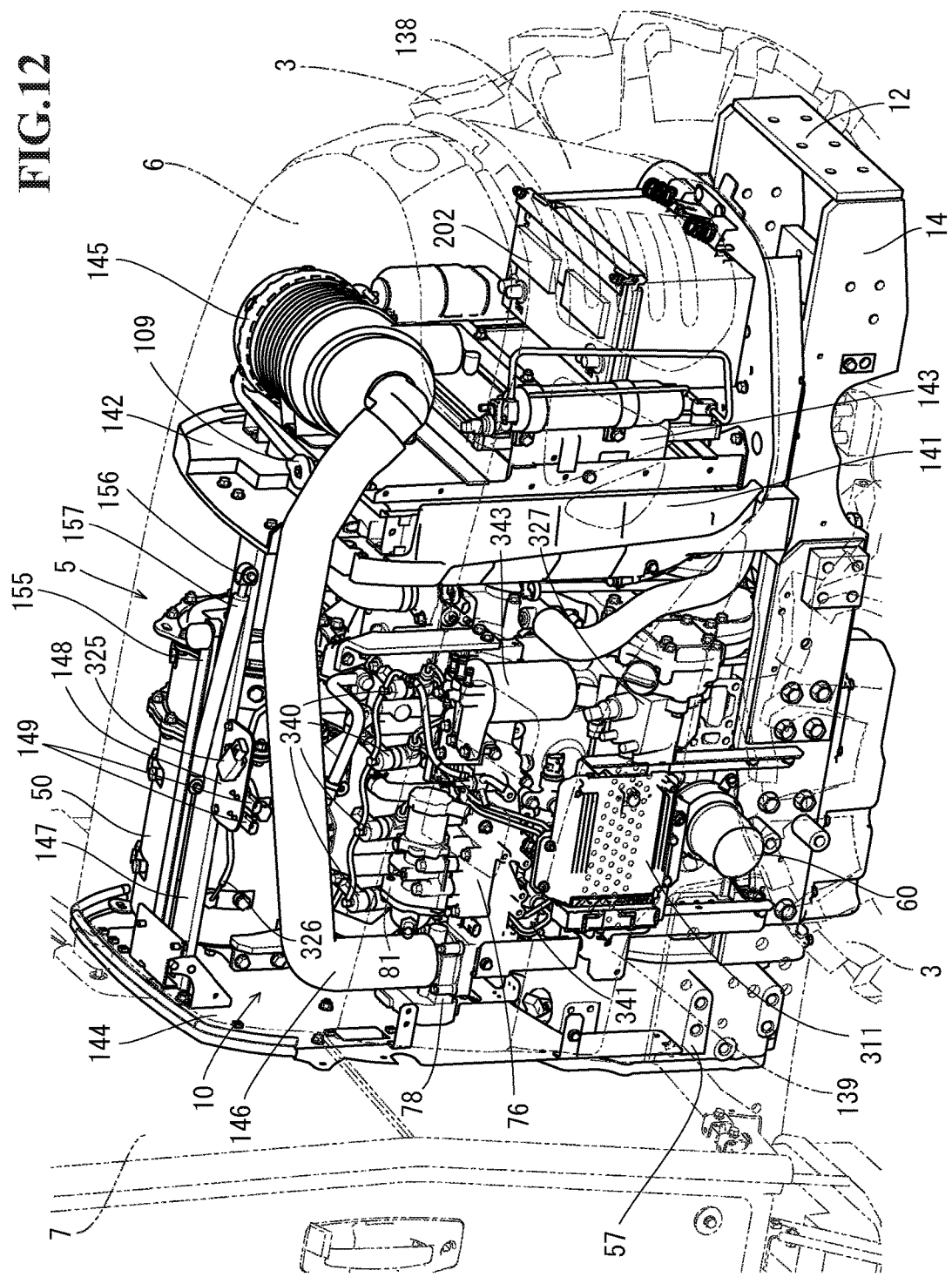
FIG. 12 is a perspective view illustrating the constitution of an engine room.

Next, the constitution of the interior of an engine room 10 below the hood 6 will be described referring to FIG. 12. A front grill 138 is formed on the lower side of the front portion of the hood 6. The front, upper, right, and left sections of the engine 5 are covered with the hood 6 and right and left engine covers 139 supported on the engine frames 14. The radiator 109 on which a fan shroud 141 is mounted on the rear surface side thereof is vertically installed on the front portion side of the engine room 14 in such a manner as to be positioned on the front surface side of the engine 5. The fan shroud 141 surrounds the outer circumferential side of the cooling fan 56 and communicates with the radiator 109 and the cooling fan 56.

A framed frame 142 formed in a rectangular frame is vertically installed on the front surface side of the radiator 109. An oil cooler 143 for cooling the hydraulic oil in the mission case 17 (see FIG. 3) and the battery 202 for supplying electric power are arranged in front of the framed frame 142. After the cooling wind blows against the oil cooler 143 and the radiator 109 by the rotation of the cooling fan 56, the cooling wind flows to the engine 5 by way of the fan shroud 141.

The air cleaner 145 for purifying the fresh air introduced into the engine 5 is arranged above the oil cooler 143 and the battery 202 in front of the framed frame 142. An intake joint pipe 146 extended from one side surface of the air cleaner 145 is coupled with the inlet portion of the intake manifold 53 via the EGR device 76. A fresh air introduction pipe for introducing the fresh air into the air cleaner 145 is formed on the outer circumferential surface of the air cleaner 145.

A shielding plate 144 that partitions the side of the engine 5 and the side of the dashboard 263 (steering column) is provided on the front surface side of the cabin 7. The right and left engine covers 139, the hood 6, and the shielding plate 144 constitute the engine room 10 that surrounds the front, rear, right, left, and the upper sections of the engine 5. An upper support frame 147 formed longitudinally back and forth is bridged over between the upper portion of the rear surface of the fan shroud 141 and the upper portion of the front surface of the shielding plate 144. In contrast, a hood stay 155 formed longitudinally back and forth is provided at a section facing the upper support frame 147 on the inner surface side of the hood 6. The rear end side of the hood stay 155 is mounted on the shielding plate 144 in a vertically rotatable manner via a hood opening/closing fulcrum shaft 156. A gas damper 157 is installed in such a manner as to be bridged between the upper support frame 147 and the hood stay 155.

The end portion on the side of the rod of the gas damper 157 is pivotally fitted in a rotatable manner by means of a pin shaft laterally oriented right and left on the front portion side of the upper support frame 147. The end portion on the side of the cylinder of the gas damper 157 is pivotally fitted in a rotatable manner by means of a pin shaft laterally oriented right and left on the back-and-forth midway portion of the hood stay 155. After the operation of releasing the lock on a hood locking mechanism is made, the front portion of the hood 6 is lifted upward, which causes the hood 6 to rotate upward about the hood opening/closing fulcrum shaft 156, and spaces in front of and above the engine 5 are opened. Then, the hood 6 is held at an opened position by the propping action of the gas damper 157.

A sensor bracket (sensor support body) 148 for supporting the differential pressure sensor 325 in which an electric wire connector is integrally provided is mounted on the upper support frame 147. The sensor bracket 148 is detachably mounted on the upper support frame 147 and also supports an electric wire connector 149 of the DPF temperature sensor 326 (see FIG. 13) along with the differential pressure sensor 325.

The sensor bracket 148 attached to the upper support frame 147 is arranged on the upper side of the exhaust gas purification device 50. Accordingly, the differential pressure sensor 325 supported with the sensor bracket 148 can measure a difference in pressure of the exhaust gas between the upstream side and the downstream side of the soot filter 40. Also, the sensor bracket 148 can be arranged at a position apart from the exhaust gas purification device 50, so that influence on the electric components supported with the sensor bracket 148, due to the waste heat from the exhaust gas purification device 50, can be reduced.

The DPF temperature sensors 326 (see FIG. 13) are an upstream side gas temperature sensor and a downstream side gas temperature sensor, each of which is of a thermistor type, and installed in the purification housing 87. Regarding the DPF temperature sensors 326, an exhaust gas temperature on the end surface on the gas inflow side of the diesel oxidation catalyst 88 is detected by the upstream side gas temperature sensor, and an exhaust gas temperature on the end surface on the gas outflow side of the diesel oxidation catalyst 88 is detected by the downstream side gas temperature sensor.

The differential pressure sensor 325 is connected to respective sensor pipe boss bodies arranged on the upstream side and on the downstream side in such a manner as to sandwich the soot filter 89 in the purification housing 87 via sensor pipes on the upstream side and on the downstream side. The differential pressure sensor 325 detects a difference in exhaust gas pressure between the upstream side and the downstream side of the soot filter 89. It is configured such that an amount of accumulation of the particulate matter in the soot filter 89 is calculated based on the difference in exhaust gas pressure between the upstream side and the downstream side of the soot filter 89, and the clogging state in the soot filter 89 can be grasped.

Next, the constitution to execute various controls (transmission control, automatic horizontal control, and tilling depth automatic control, and the like) of the tractor 1 will be described referring to FIG. 13. As illustrated in FIG. 13, the tractor 1 includes the engine controller 311 for controlling the drive of the engine 5, a meter controller (driving operation display controller) 312 for controlling the display operation of the meter panel 246 mounted on the steering column (maneuvering column) 245, and a main machine controller 313 for performing the speed control of the travelling machine body 2.

The aforementioned controllers 311 to 313 each include a ROM that stores control programs and data, a RAM that temporarily stores the control programs and data, a timer as a timing device, input and output interfaces, and the like, besides the CPUs that execute various mathematical processing and control, and the controllers are mutually connected in a communicable manner via a CAN communication bus 315. The engine controller 311 and the meter controller 312 are connected to a battery 202 via a power application key switch 201. The key switch 201 is a rotary-type switch that can be operated in a rotatable manner by use of a predetermined key inserted into a keyhole and mounted at a position on the right side of the steering column 245 of the dashboard 263 as illustrated in FIG. 6.

A steering potentiometer 210 for detecting the amount of rotation (steering angle) of the steering handle 9, the regeneration switch 329 as an input member for permitting the regenerating operation of the exhaust gas purification device 50, the control method selection switch 271 for setting any of the droop control or the isochronous control as the control method (governing mode) of the engine 5, and the mode selection switch 272 for setting the advisability of the rotational speed limits of the engine 5 are connected to input side of the meter controller 312.

Also, the liquid crystal display panel 330 of the meter panel 246, a warning buzzer 331 for sounding in association with the regenerating operation of the exhaust gas purification device 50, and the regeneration lamp 332 as a warning lamp that flickers in association with the regenerating operation of the exhaust gas purification device 50, the regeneration switch lamp 345 that is incorporated in the regeneration switch 329 and flickers in accordance with the regenerating operation of the exhaust gas purification device 50, the parking brake lamp 346 that lights up in a case where the parking brake lever 254 is in the lock state, the engine abnormality lamp 347 that lights up in a case where the engine 5 is a state of abnormality, the PTO lamp 348 that lights up in a case where the PTO clutch switch 225 is turned on, and the reverser neutral lamp 349 that lights up in a case where the forward/backward switching lever 252 is in the neutral state, are connected to the output side of the meter controller 312.

The input side of the main machine controller 313 is connected to a forward/backward potentiometer 211 for detecting the operating position of the forward/backward switching lever 252, a main transmission output shaft rotation sensor 212 for detecting the number of output revolutions of the main transmission output shaft 36, a vehicle speed sensor 213 for detecting the rotational speed (travelling speed) of the front wheels 3 and the rear wheels 4, a brake pedal switch 220 for detecting the presence or absence of the depressing of the brake pedals 251, an autobrake switch 221 for operating the switching of the autobrake electromagnetic valves 67a and 67b, the main transmission potentiometer 222 for detecting the operating position of the main transmission lever 290, a position dial sensor 223 for detecting the operating position of the work portion position dial 300 that manually changes and adjusts the height position of the rotary cultivator 15, a parking brake switch 236 that is turned on in a state where the right and left brake pedals 251 are held at the depressing position by use of the parking brake lever 254 (in a lock state by use of the parking brake lever 254), and the PTO clutch switch 225.

The output side of the main machine controller 313 is connected to the forward clutch electromagnetic valve 46 for actuating the forward clutch cylinder (not illustrated), the backward clutch electromagnetic valve 48 for actuating the backward clutch cylinder (not illustrated), the PTO clutch hydraulic electromagnetic valve 104 for actuating the PTO clutch not illustrated, the control electromagnetic valve 121 for supplying the hydraulic oil to the single-acting hydraulic cylinder (not illustrated) of the hydraulic hoisting and lowering mechanism 20, the proportional control valve 123 for actuating the main transmission hydraulic cylinder (not illustrated) in proportion to a manipulated variable in tilting the main transmission lever 290, the high-speed clutch electromagnetic valve 136 for actuating the auxiliary transmission hydraulic cylinder (not illustrated), and the autobrake electromagnetic valves 67a and 67b for respectively actuating the right and left brake actuating mechanisms 65a and 65b.

Figure 14:
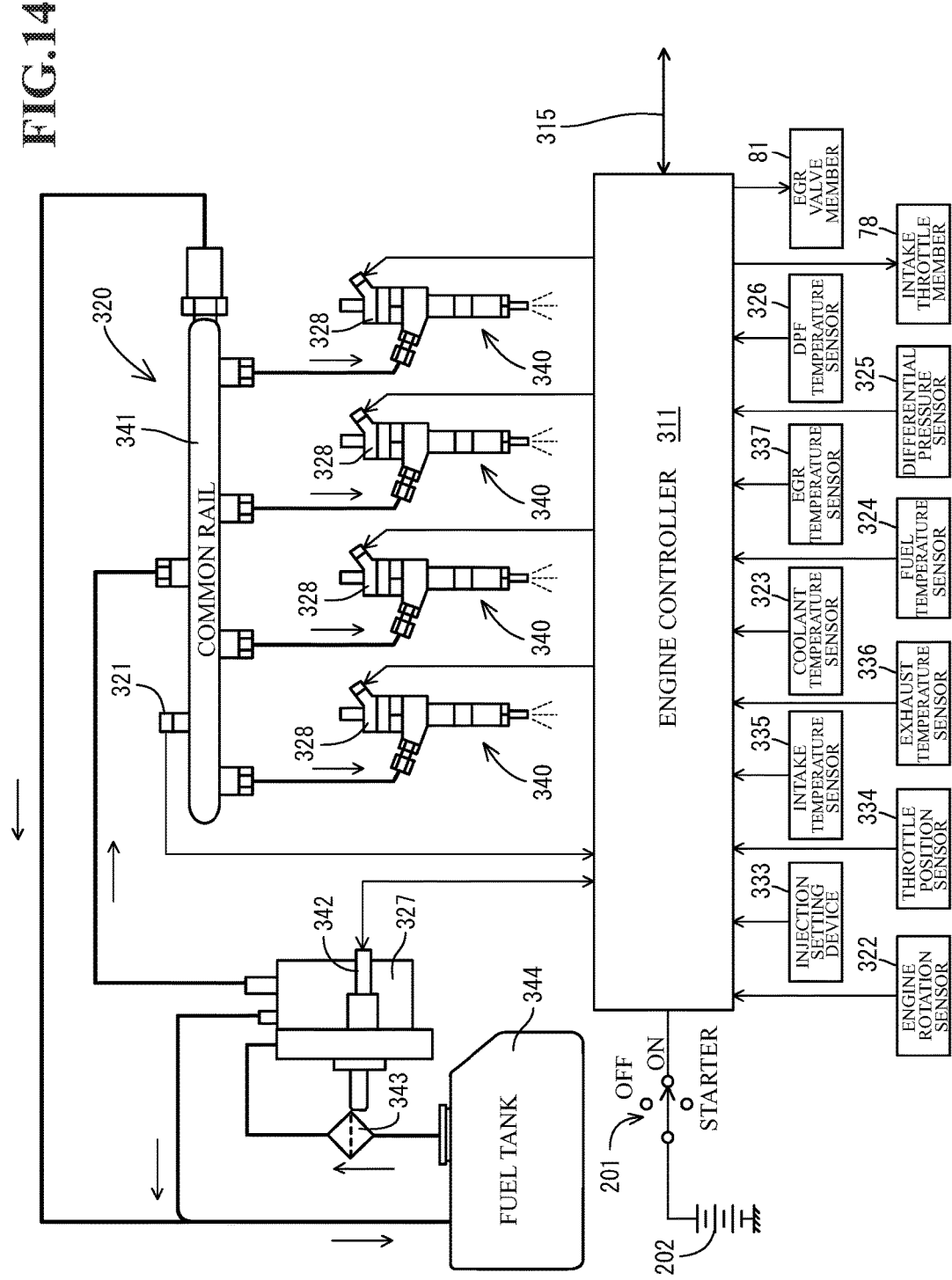
FIG. 14 is an explanatory view of a fuel system of the engine.

Also, as illustrated in FIG. 14, the input side of the engine controller 311 is connected at least to a rail pressure sensor 321 for detecting fuel pressure in the common rail 341, an electromagnetic clutch 342 for rotating or stopping the fuel supply pump 327, an engine rotation sensor 322 for detecting the rotational speed (the position of the camshaft of the engine output shaft 24) of the engine 5, an injection setting device 333 for setting and detecting the number of times of fuel injections (the number of times during fuel injection in one stroke) of the injectors 340, a throttle position sensor 334 for detecting the operating position of an accelerator operating tool, an intake temperature sensor 335 for detecting an intake temperature in an intake path, an exhaust temperature sensor 336 for detecting an exhaust gas temperature in an exhaust path, a coolant temperature sensor 323 for detecting a coolant temperature of the engine 5, a fuel temperature sensor 324 for detecting a fuel temperature in the common rail 341, an EGR temperature sensor 337 for detecting the temperature of EGR gas, a differential pressure sensor 325 for detecting the differential pressure of the exhaust gas prior and subsequent (upstream and downstream) to the soot filter 89 in the exhaust gas purification device 50, and a DPF temperature sensor 326 for detecting an exhaust gas temperature in the exhaust gas purification device 50.

The output side of the engine controller 311 is connected at least to an electromagnetic solenoid of each fuel injection valve 328. That is, it is constituted such that the high-pressure fuel accumulated in the common rail 341 is injected from the fuel injection valve 328 in plural times in a separate manner during one stroke while controlling fuel injection pressure, an injection time, an injection period, and the like, thereby suppressing the occurrence of the nitride oxides (NOx) and executing complete combustion in which the occurrence of soot or carbon dioxide ($CO_2$) is reduced, which improves fuel efficiency. Also, the output side of the engine controller 311 is also connected to the intake throttle member 78 for adjusting the intake pressure (intake amount) of the engine 5, the EGR valve member 81 for adjusting the amount of EGR gas supplied to the intake manifold 53, and the like.

Basically, the engine controller 311 obtains the torque of the engine 5 based on the rotational speed detected by the engine rotation sensor 322 and a throttle position detected by the throttle position sensor 334, calculates a target fuel injection amount by use of the torque and output characteristics, and executes fuel injection control that actuates the common rail 341 based on the calculated results. It is noted that the fuel injection amount of the common rail 341 is mainly adjusted by adjusting the period of opening each fuel injection valve 328 and changing the fuel injection period of each injector 340.

Figure 15:
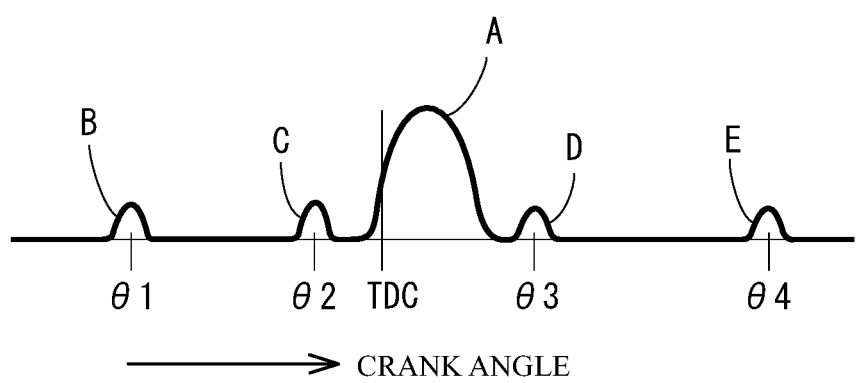
FIG. 15 is a view to describe the injection timing of fuel.

As illustrated in FIG. 15, a common rail device 320 that includes the common rail 341 connected to the injectors 340 is configured to execute a main injection A in the neighborhood that sandwiches a top dead center (TDC). Also, besides the main injection A, the common rail device 320 is configured to execute a small amount of pilot injection B for the purpose of reducing NOx and noise at the time of a crank angle θ1 prior to about 60 degrees with respect to the top dead center, execute pre-injection C for the purpose of noise reduction at the time of a crank angle θ2 immediately before the top dead center, and execute after-injection D and post-injection E at the times of crank angles θ3 and θ4 after the top dead center for the purpose of reducing particulate matter (hereinafter referred to as PM) or facilitating the purification of the exhaust gas.

The pilot injection B is aimed at facilitating the mixture of fuel and air by injecting the fuel at the time of being substantially advanced with respect to the main injection A. The pre-injection C is aimed at reducing the delay of an ignition time at the main injection A by injecting the fuel prior to the main injection A. The after-injection D is aimed at activating the diffusion combustion by injecting fuel with a slight delay with respect to the main injection A and increasing (re-combusting the PM) the temperature of the exhaust gas from the engine 5. The post-injection E is aimed at supplying fuel as unburnt fuel, which does not contribute to an actual combustion process, to the exhaust gas purification device 50 by injecting fuel at the time of being substantially delayed with respect to the main injection A. The unburnt fuel supplied to the exhaust gas purification device 50 reacts on a diesel oxidation catalyst 243, and the temperature of the exhaust gas in the exhaust gas purification device 50 increases in response to the reaction of heat. Herein, broadly speaking, the rise and fall of peaks in a graph in FIG. 15 represent the differences between the fuel injection amounts of respective injection stages A to E.

Figure 16:
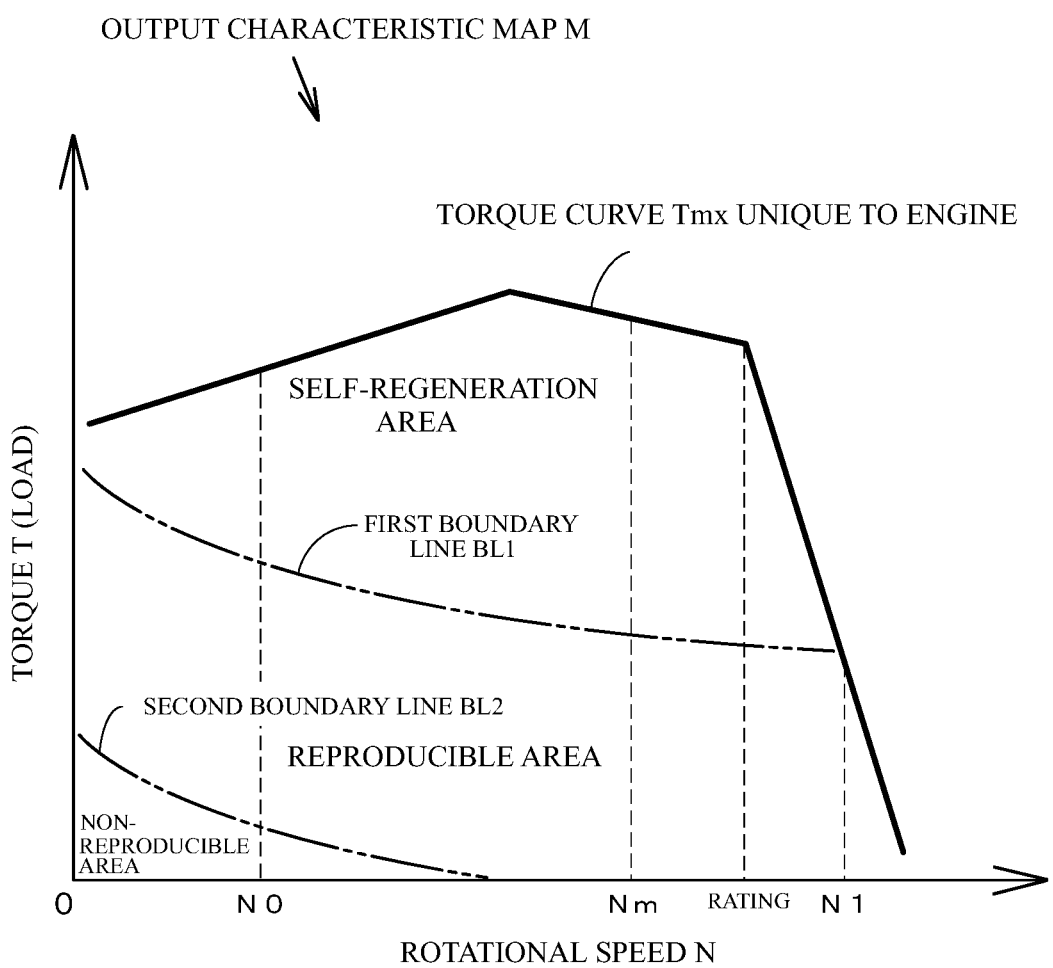
FIG. 16 is an explanatory view of an output characteristic map.

The EEPROM of an ECU 311 stores an output characteristic map M (see FIG. 16) in advance, which indicates the relation of a rotational speed N and torque T (load) of the engine 5. Also, although its detail is omitted, an exhaust gas flow rate map used to calculate the flow rate of the exhaust gas based on the relation of the rotational speed N of the engine 5 and the fuel injection amount and a PM emission map used to calculate the PM emission of the engine 5 similarly based on the relation of the rotational speed N of the engine 5 and the fuel injection amount are stored in the EEPROM of the ECU 311 in advance. Each map such as the output characteristic map M is obtained by experiment and the like. In the output characteristic map M illustrated in FIG. 16, a horizontal axis represents the rotational speed N, and a vertical axis represents the torque T. The output characteristic map M is an area surrounded by a solid line Tmx drawn in an upward convex shape. The solid line Tmx is a maximum torque line that represents the maximum torque with respect to each rotational speed N. In this case, when the engine 5 is of the same type, any output characteristic map M stored in the ECU 311 has the same (common) characteristics. As illustrated in FIG. 16, the output characteristic map M is vertically divided into three sections by boundary lines BL1 and BL2 that represent the relation of the rotational speed N and the torque T at a predetermined exhaust gas temperature.

An area on the upper side with respect to the first boundary line BL1 is a self-regeneration area in which the PM accumulated in the soot filter 89 is oxidized and removed only with the normal operation of the engine 5 (the oxidizing action of the diesel oxidation catalyst 88 works). An area between the first boundary line BL1 and the second boundary line BL2 is a reproducible area in which the PM accumulated is not oxidized and removed with the normal operation of the engine 5 and accumulated in the soot filter 89, but the exhaust gas purification device 50 is regenerated by the execution of assist regeneration control and reset regeneration control, each of which is described later. An area on the lower side with respect to the second boundary line BL2 is a non-reproducible area in which the exhaust gas purification device 50 is not regenerated by the execution of the assist regeneration control and the reset regeneration control. The exhaust gas temperature of the engine 5 in the non-reproducible area is too low, so that even when the assist regeneration control and the reset regeneration control is performed from this state, the exhaust gas temperature does not rise to a regeneration boundary temperature. That is, when the relation of the rotational speed N and the torque T of the engine 5 is in the non-reproducible area, the exhaust gas purification device 50 is not regenerated by the assist regeneration control and the reset regeneration control (the particulate matter collection capacity of the soot filter 89 is not restored). It is noted that the exhaust gas temperature on the first boundary line BL1 is the regeneration boundary temperature (about 300 degrees Celsius) that is self-reproducible.

Figure 17:
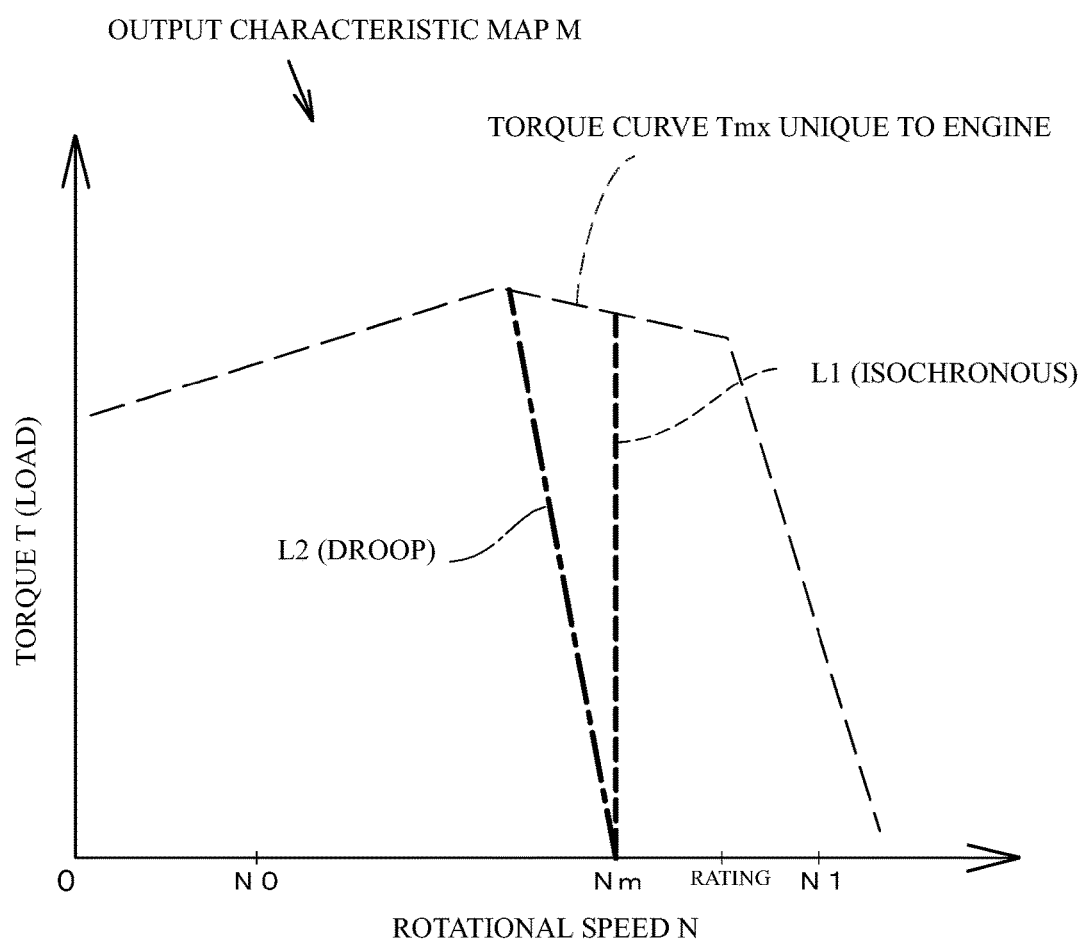
FIG. 17 is an explanatory view illustrating the relation of isochronous control and droop control.

As illustrated in FIG. 17, with regard to the relation of the rotational speed N and the torque T, the engine controller 311 can execute the droop control in which the fuel injection amount is adjusted in such a manner that the rotational speed N is reduced as the load (torque T) of the engine 5 increases, and the isochronous control in which the fuel injection amount is adjusted in such a manner that the rotational speed N is kept constant irrespective of the variation in the load of the engine 5. The control method selection switch 271 is operated by the operator, thereby alternatively switching to any of the droop control and the isochronous control. That is, the engine controller 311 recognizes whether the control method designated by the control method selection switch 271 is the droop control or the isochronous control, through the meter controller 312 and the CAN communication bus 315.

The droop control is executed, for example, during road driving. A droop characteristic (the relation of the rotational speed N and the torque T during the droop control) is a characteristic represented by a straight line (a dash-dot line L1 in FIG. 17) whose gradient is uniformly inclined downward to the right in the output characteristic map M. When the droop control is selected, the engine controller 311 calculates a target fuel injection amount based on the manipulated variable of the accelerator pedal 255 and executes the fuel injection control of the common rail device 320.

The isochronous control is executed, for example, during various works such as plowing work and tilling work. The isochronous characteristic (the relation of the rotational speed N and the torque T during the isochronous control) is a characteristic represented by a vertical line (a dashed line L2 in FIG. 17) whose gradient is zero in the output characteristic map M. When the isochronous control is selected, the engine controller 311 calculates a target fuel injection amount based on a difference between the rotational speed N detected by the engine rotation sensor 322 and a target rotational speed Nt in such a manner as to maintain the target rotational speed Nt designated by the main transmission lever 290 and executes the fuel injection control of the common rail device 320.

The engine controller 311 has a power mode in which the workability of a work vehicle is emphasized and an economy mode in which fuel consumption is emphasized, as the control modes of the engine 5. The economy mode is a high idle limit mode selected in a case where the output of the engine is restrained low for the purpose of low fuel consumption or reduction of noise, and the target fuel injection amount is set based on a limit value Nh (for example, 1800 rpm) of a high idle rotational speed (the rotational speed of the maximum limit when no load is applied). The power mode is a high idle limit release mode selected in a case where the massive engine output is required during running or works, and the target fuel injection amount is set based on the maximum rotational speed that is higher than the limit value Nh of the high idle rotational speed. The power mode and the economy mode are designated by the mode selection switch 272 through the meter controller 312 and the CAN communication bus 315.

Figure 18:
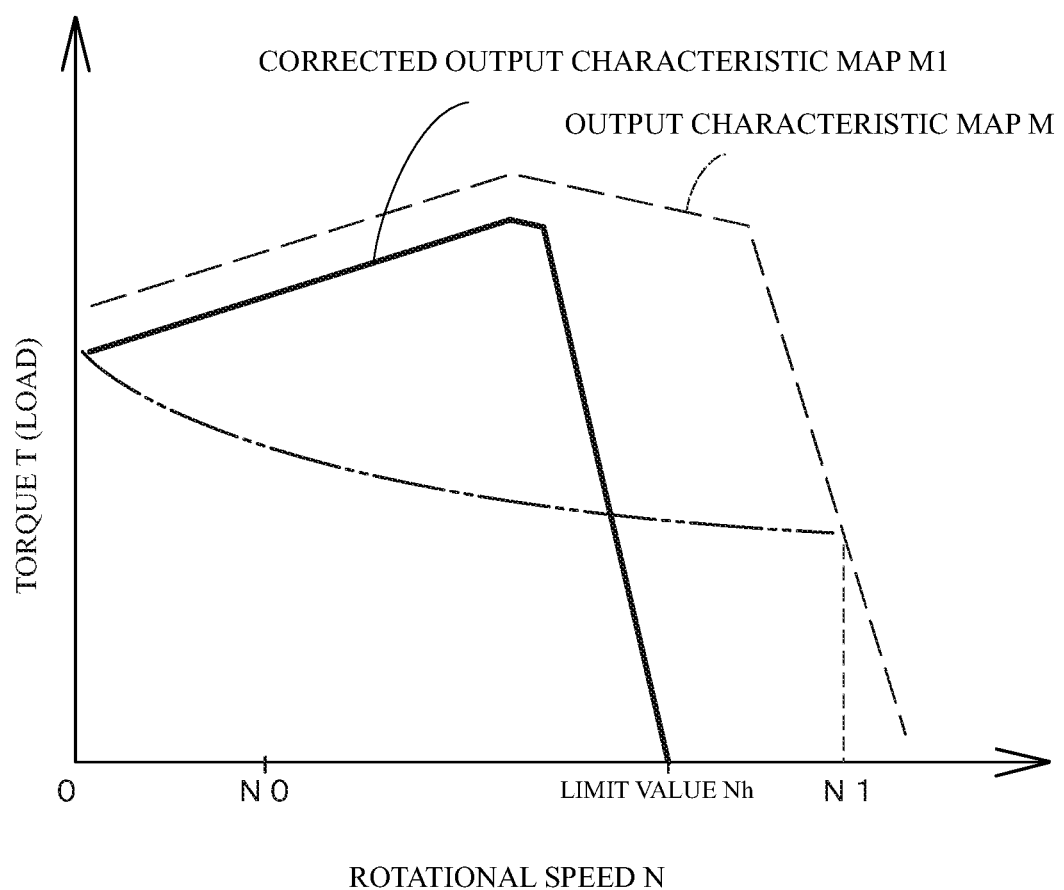
FIG. 18 is an explanatory view of the output characteristic map during high idle limits.

When the economy mode (the high idle limit mode) is selected with the mode selection switch 272, the engine controller 311 refers to the limit value Nh of the high idle rotational speed, which is stored in the RAM in advance. Accordingly, the controller 311, as illustrated in FIG. 18, corrects the output characteristic map M in accordance with the limit value Nh and produces an output characteristic M1. The engine controller 311 calculates the target fuel injection amount based on the output characteristic map M1 corrected with the limit value Nh and executes the fuel injection control of the common rail device 320. Accordingly, in the economy mode (the high idle limit mode), the maximum rotational speed of the engine 5 is limited to the limit value Nh of the high idle rotational speed or lower.

When the power mode (the high idle limit release mode) is selected with the mode selection switch 272, the engine controller 311 calculates the target fuel injection amount based on the output characteristic map M and executes the fuel injection control of the common rail device 320. Accordingly, in the power mode (the high idle limit release mode), the maximum rotational speed of the engine 5 reaches a value higher than the limit value Nh of the high idle rotational speed, thereby increasing the rotational speed to a predetermined high rotational speed (e.g., 2200 rpm) in non-work regeneration control described later.

The control methods (regeneration control method) of the engine 5 include normal operating control (self-regeneration control) in which the exhaust gas purification device 50 voluntarily regenerates only by the normal operation of the engine 5, the assist regeneration control in which when the clogging state of the exhaust gas purification device 50 reaches a prescribed level or higher, the exhaust gas temperature is automatically raised by use of an increase in load of the engine 5, the reset regeneration control in which the exhaust gas temperature is raised with the post-injection E, and the non-work regeneration control (also referred to as parking regeneration control or urgency regeneration control) in which the exhaust gas temperature is raised with the combination of the post-injection E and a predetermined high rotational speed N1 of the engine 5.

The normal operating control is control form during road running or agricultural work. In the normal operating control, the relation of the rotational speed N to the torque T of the engine 5 is in the self-regeneration area of the output characteristics map, and the exhaust gas temperature of the engine 5 is high to the extent that the amount of PM oxidized in the exhaust gas purification device 50 exceeds the amount of PM captured.

In the assist regeneration control, the exhaust filter 50 is regenerated by adjusting the open degrees of the intake throttle member 78 and after-injection. That is, in the assist regeneration control, the valve of the EGR valve member 81 is closed while the valve of the intake throttle member 78 is closed (throttled) to a predetermined open degree, thereby restricting the intake amount supplied to the engine 5. In this manner, load in the engine 5 increases, which causes the fuel injection amount of the common rail 341 to increase in order to maintain the setting rotational speed and leads to an increase in the exhaust gas temperature of the engine 5. In step with this, diffusion combustion is activated by the after-injection D in which an injection timing is slight delayed with respect to the main injection A, thereby increasing the exhaust gas temperature of the engine 5. As a result, the PM in the exhaust gas purification device 50 is combusted and removed. It is noted that the valve of the EGR valve member 81 is closed in any regeneration control described below.

The reset regeneration control is performed when the assist regeneration control fails (when the clogging state of the exhaust gas purification device 50 is not improved, and the PM remains) or when a cumulative drive time T1 of the engine 5 becomes equal to or higher than a setting time T11 (for example, approximately 100 hours). In the reset regeneration control, the exhaust gas purification device 50 is regenerated by performing the post-injection E, in addition to the mode of the assist regeneration control. That is, in the reset regeneration control, in addition to the adjustment of the opening degrees of the intake throttle member 78 and the after-injection, unburned fuel is directly supplied in the exhaust gas purification device 50 by the post-injection E, and the unburned fuel is combusted by use of the diesel oxidation catalyst 88, thereby raising the exhaust gas temperature in the exhaust gas purification device 50 (about 560 degrees Celsius). As a result, the PM in the exhaust gas purification device 50 is compulsorily combusted and removed.

The non-work regeneration control is performed when the reset regeneration control fails (when the clogging state of the exhaust gas purification device 50 is not improved, and the PM remains) or the like. In the non-work regeneration control, in addition to the mode of the reset regeneration control, the rotational speed N of the engine 5 is maintained at the predetermined high rotational speed N1 (for example, 2200 rpm), thereby raising the exhaust gas temperature of the engine 5 and subsequently raising the exhaust gas temperature in the exhaust filter 50 by the post-injection E (about 600 degrees Celsius). As a result, under better favorable condition, compared with the reset regeneration control, the PM in the exhaust gas purification device 50 is compulsorily combusted and removed. It is noted that the valve of the intake throttle member 78 is not throttled, but fully closed in the non-work regeneration control. The after-injection D in the non-work regeneration control is retarded (delayed) with respect to the assist regeneration control or the reset regeneration control.

In the non-work regeneration control, the output of the engine 5 is limited to a parking time maximum output (for example, approximately 80 percent of the maximum output), which is lower than the maximum output. In this case, the rotational speed N of the engine 5 is maintained at the predetermined high rotational speed N1, so that the fuel injection amount of the common rail 341 is adjusted in such a manner as to suppress the torque T and reach the parking time maximum output.

In the assist regeneration control and the reset regeneration control, not to mention the normal operating control, for example, the power of the engine 5 is transmitted to the operating portions of the work machine, thereby executing various works (the engine 5 can be driven under the normal operation). In this time, the engine controller 311 controls the drive of the engine 5 based on the control method (the droop control or the isochronous control) designated by the control method selection switch 271. Also, the engine controller 311 controls the drive of the engine 5 based on the control mode (the economy mode or the power mode) designated by the mode selection switch 272.

Figure 19:
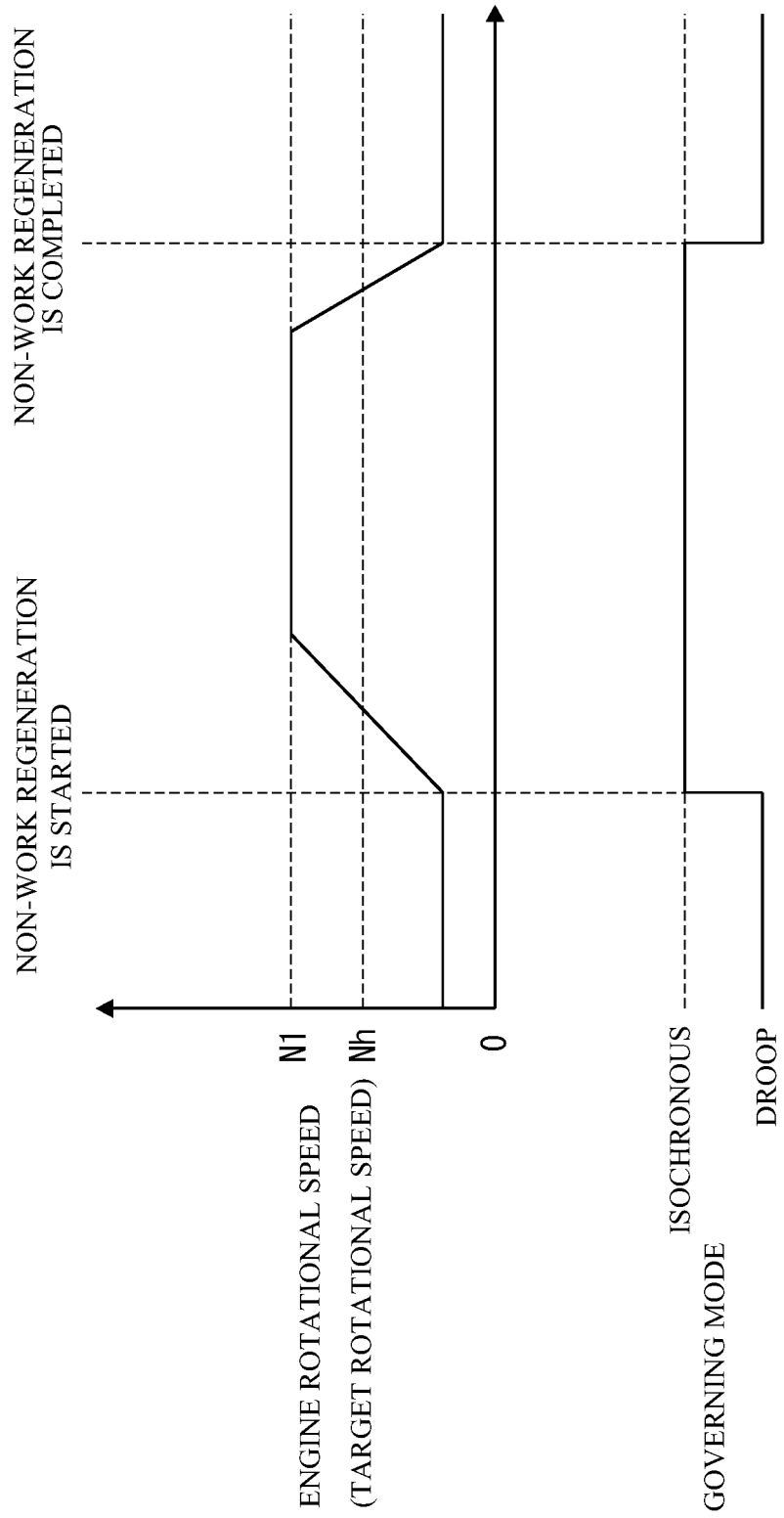
FIG. 19 is an explanatory view of the output characteristic map during the high idle limits.

In the non-work regeneration control, the engine 5 is solely driven at a high rotational speed so as to combust and remove the PM, so that for example, the operating portions of the work machine are not driven by the power of the engine 5. In this time, the engine controller 311, as illustrated in FIG. 19, compulsorily controls the drive of the engine 5 under the isochronous control, irrespective of the control method designated by the control method selection switch 271. Also, the engine controller 311, as illustrated in FIG. 19, controls the drive of the engine 5 with the power mode (the high idle limit release mode), irrespective of the control mode designated by the mode selection switch 272.

Next, one example of the regeneration control of the exhaust gas purification device 50 by means of the engine controller 311 will be described referring to flowcharts in FIGS. 20 and 21. That is, algorithms (programs) illustrated in FIGS. 20 and 21 are stored in the ROM of the engine controller 311, and the algorithm is invoked in the RAM and processed by the CPU, thereby executing each regeneration control described above.

Figure 20:
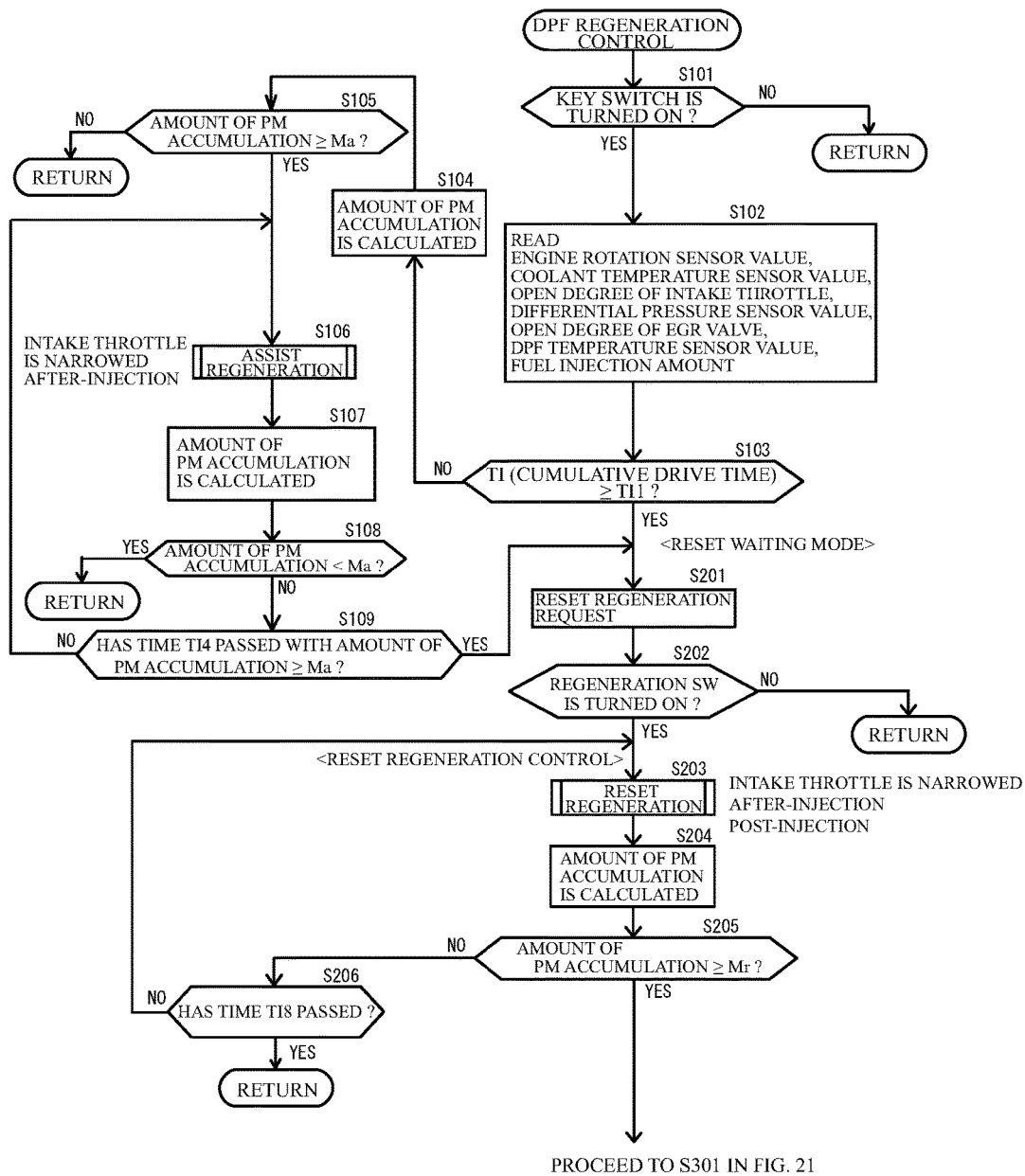
FIG. 20 is a flowchart of assist regeneration control and reset regeneration control.
Figure 21:
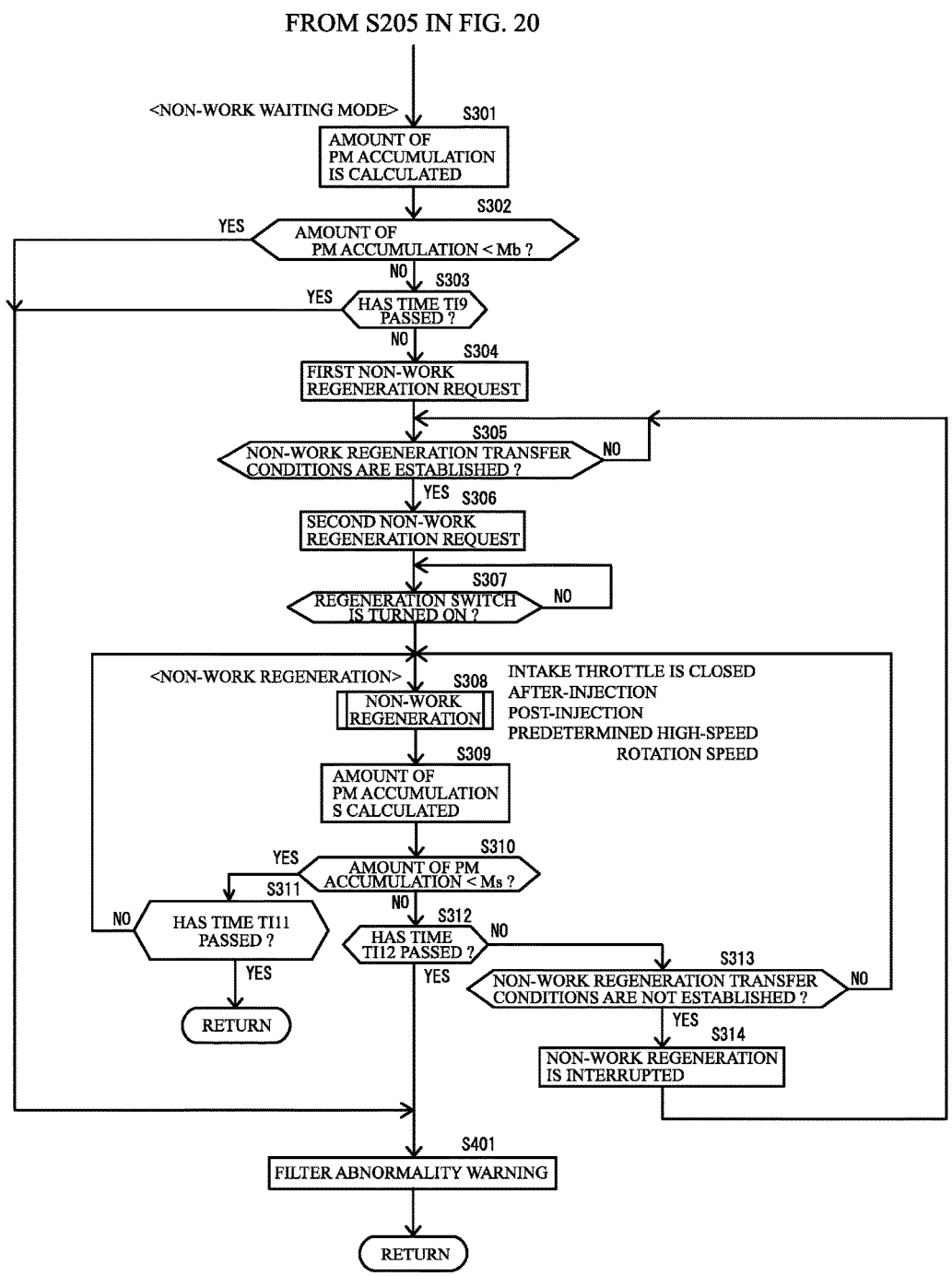
FIG. 21 is a flowchart of non-work regeneration control.

As illustrated in FIG. 20, in the regeneration control of the exhaust gas purification device 50, first, when the key switch 201 is turned on (S101: YES), the detection values of the engine rotation sensor 322, the coolant temperature sensor 323, the differential pressure sensor 325, and the DPF temperature sensor 326, and the opening degrees of the intake throttle member 78 and the EGR valve member 81, and the fuel injection amount of the common rail 341 are read in (S102). That is, the engine controller 311 reads the detection values of the engine rotation sensor 322, the coolant temperature sensor 323, the differential pressure sensor 325, and the DPF temperature sensor 326, and the opening degrees of the intake throttle member 78 and the EGR valve member 81, and the fuel injection amount of the common rail 341.

Subsequently, when the cumulative drive time T1 is less than the setting time T11 (for example, 50 hours) after the execution of the reset regeneration control or the non-work regeneration control in the past (S103: NO), an amount of PM accumulation in the exhaust gas purification device 50 is estimated (S104). The estimation of the amount of PM accumulation is performed by a P method based on the detection value of the differential pressure sensor 325 and an exhaust gas flow rate map and by a C method based on the detection value of the engine rotation sensor 322, the fuel injection amount, a PM emission map, and the exhaust gas flow rate map. When the amount of PM accumulation is equal to or higher than a prescribed amount Ma (e.g., 8 g/l) (S105: YES), the assist regeneration control is executed (S106).

During the execution of the assist regeneration control, the amount of PM accumulation in the exhaust gas purification device 50 is estimated based on the detection value of the engine rotation sensor 322, the fuel injection amount, the PM emission map, and the exhaust gas flow rate map (S107). When the amount of PM accumulation is less than the prescribed amount Ma (e.g., 6 g/l) (S108: YES), the assist regeneration control is finished, and the normal operation control is returned. When the amount of PM accumulation is equal to or higher than the prescribed amount Ma (S108: NO), and when a predetermined time T14 (e.g., 10 minutes) has passed in this state (S109: YES), the processing proceeds to Step S201, which is a reset waiting mode prior to the assist regeneration control.

Returning to Step S103, when the cumulative drive time T1 is equal to or higher than the setting time T11 (S103: YES), the processing proceeds to Step S201, which is the reset waiting mode, and a reset regeneration request is executed. In this stage, the regeneration lamp 332 and the regeneration switch lamp 345 flicker at a low speed (e.g., 0.5

Hz), and the warning buzzer 331 intermittently sounds at a low speed (e.g., 0.5 Hz). Accordingly, the operator can instantly verify the position of the regeneration switch 329, which urges the operator to perform manual operation, according to regeneration control request warnings based on respective drives of the warning buzzer 331, the regeneration lamp 332, and the regeneration switch lamp 345.

Thereafter, when the regeneration switch 329 is turned on for a predetermined period of time (e.g., three seconds) (S202: YES), the reset regeneration control is executed (S203). In this stage, the engine controller 311 lights up the regeneration lamp 332 and the regeneration switch lamp 345 while stopping the sound of the warning buzzer 331. Accordingly, the operator can verify a state of the regeneration switch 329 (the lighting of the regeneration switch lamp 345), so that the operator can easily, visually recognize that the reset regeneration control is under execution, and the operator's attention can be awakened.

The amount of PM accumulation in the exhaust gas purification device 50 is estimated during the execution of the reset regeneration control (S204), and when the amount of PM accumulation is in a state of being less than the prescribed amount Mr (e.g., 10 g/l) (S205: NO), and when a predetermined time T18 (e.g., 30 minutes) has passed from the start of the reset regeneration control (S206: YES), the reset regeneration control is finished, and the normal operation control is returned. In this time, the regeneration lamp 332 and the regeneration switch lamp 345 are turned off so as to finish the reset regeneration control. In contrast, when the amount of PM accumulation is equal to or higher than the prescribed amount Mr (S205: YES), it is regarded that the reset regeneration control fails, and there is a possibility that the PM might be excessively accumulated, so that the processing proceeds to Step S301, which is a parking waiting mode prior to the non-work regeneration control.

As illustrated in FIG. 21, in the parking waiting mode, first, the amount of PM accumulation in the exhaust gas purification device 50 is estimated (S301). Then, when the amount of PM accumulation is less than a prescribed amount Mb (e.g., 12 g/l) (S302: NO) and within a predetermined time T19 (e.g., 10 hours) (S303: NO), a first non-work regeneration request is executed (S304). In this stage, the regeneration switch lamp 345 remains off, but the regeneration lamp 332 and the engine abnormality lamp 347 flicker at a high speed (e.g., 1.0 Hz), the warning buzzer 331 intermittently sounds at a high speed (e.g., 1.0 Hz). Accordingly, the operator can recognize that the establishment of the non-work regeneration transfer conditions (interlock release conditions) is required so as to execute the non-work regeneration control, according to regeneration control request warnings based on respective drives of the warning buzzer 331, the regeneration lamp 332, and the engine abnormality lamp 347.

In contrast, when the amount of PM accumulation is equal to or higher than the prescribed amount Mb (S302: YES), or when the predetermined time T19 (e.g., 10 hours) has passed while the parking waiting mode is held (S303: YES), there is a possibility that the PM might be excessively accumulated, so that the abnormality of the exhaust gas purification device 50 is notified (STEP 401). In this time, the engine abnormality lamp 347 flickers at a high speed (e.g., 1.0 Hz), and the warning buzzer 331 sounds at a high speed (e.g., 1.0 Hz). In contrast, the regeneration lamp 332 and the regeneration switch lamp 345 remain off.

After the execution of the first non-work regeneration request at the aforementioned Step S304, the processing is on standby until non-work regeneration transfer conditions (interlock release conditions) set in advance are established (S305). The non-work regeneration transfer conditions illustrated in Step S305 are made up of conditions such as the neutral position of the forward/backward potentiometer 211 (the neutral state of the forward/backward switching lever 252), the On state of the parking brake switch 236 (locked state with the parking brake lever 254), the Off state of the PTO clutch switch 225, the low idle rotational speed (the minimum rotational speed during no load running) N0 of the engine 5, and the detection value of the coolant temperature sensor 323, which is equal to or higher than a predetermined value (e.g., 65 degrees Celsius) (the completion of the warming-up of the engine 5).

In Step S305, the non-work regeneration transfer conditions (interlock release conditions) are established (YES), a second non-work regeneration request is executed (S306). In this stage, the regeneration lamp 332 and the regeneration switch lamp 345 flicker at a low speed (for example, 0.5 Hz), and the engine abnormality lamp 347 flickers at a high speed (for example, 1.0 Hz), and the warning buzzer 331 is switched to the intermittent low-speed sound (for example, 0.5 Hz). Accordingly, the operator recognizes the establishment of the non-work regeneration transfer conditions (interlock release conditions), and concurrently the operator can instantly verify the position of the regeneration switch 329, which urges the operator to perform manual operation, according to regeneration control request warnings based on respective drives of the warning buzzer 331, the regeneration lamp 332, and the regeneration switch lamp 345. Also, the flickering frequency of the regeneration lamp 332 and the sounding frequency of the warning buzzer 331 are changed from a high speed to a low speed, which allows the operator to steadily recognize the establishment of the non-work regeneration transfer conditions (interlock release conditions).

Then, when the regeneration switch 329 is turned on for a predetermined period of time (S307: YES), the non-work regeneration control is executed (S308). That is, the engine controller 311 verifies that the operation of turning on the regeneration switch 329 by the operator is received and executes the non-work regeneration control. In this stage, the regeneration lamp 332, the regeneration switch lamp 345, and the engine abnormality lamp 347 are lighted up, whereas the sound of the warning buzzer 331 is stopped. Accordingly, the operator recognizes that the non-work regeneration control is executed, so that the operational errors of the operator during the execution of the non-work regeneration control can be prevented beforehand.

The engine controller 311 compulsorily executes the isochronous control that maintain constant the rotational speed of the engine 5 immediately before the execution of the non-work regeneration control, so as to drive the engine 5 solely for the purpose of the combustion and removal of the particulate matter, irrespective of the variation in the load of the engine 5. That is, as illustrated in FIG. 19, even when the droop control is designated by the control method selection switch 271, the engine controller 311 switches to the isochronous control in the case of executing the non-work regeneration control and drivingly controls the engine 5. Accordingly, when the non-work regeneration control is executed, the engine 5 maintains the predetermined high rotational speed N1 that is the parking maximum output (for example, approximately 80 percent of the maximum output), which is lower than the maximum output, and rotates, so that the exhaust gas temperature can be increased, and the PM in the exhaust gas purification device 50 is compulsorily combusted and removed under favorable conditions, and the purification capacity of the exhaust gas purification device 50 can be regenerated.

Also, when the non-work regeneration control is executed, the engine 5 rotates at the predetermined high rotational speed N1 (e.g., 2200 rpm), which is higher than the limit value Nh (e.g., 1800 rpm) of the high idle rotational speed, and therefore, limiting the maximum rotational speed of the engine 5 is not preferable. Accordingly, the engine controller 311 compulsorily invalidates (releases) the high idle limit mode (the economy mode). That is, as illustrated in FIG. 19, even when the high idle limit mode is designated by the mode selection switch 272, the engine controller 311 compulsorily releases the high idle limit mode in the case of executing the non-work regeneration control and drivingly controls the engine 5. Accordingly, when the non-work regeneration control is executed, the engine 5 rotates at the predetermined high rotational speed N1 that is the parking maximum output (for example, approximately 80 percent of the maximum output), which is lower than the maximum output, so that the exhaust gas temperature can be increased, and the PM in the exhaust gas purification device 50 is compulsorily combusted and removed under favorable conditions, and the purification capacity of the exhaust gas purification device 50 can be regenerated.

During the execution of the non-work regeneration control, the amount of PM accumulation in the exhaust filter 202 is estimated (S309). When the amount of PM accumulation is less than a prescribed amount Ms (e.g., 8 g/l) (S310: YES), and when a predetermined time T111 (e.g., 30 minutes) has passed from the start of the non-work regeneration control (S311: YES), the non-work regeneration control is finished, and the normal operation control is returned. When the amount of PM accumulation is equal to or higher than the prescribed amount Ms (S310: NO), and when a predetermined time T112 (e.g., 30 minutes) has passed in this state (S312: YES), it is regarded that the non-work regeneration control fails, and there is a possibility that the PM might be excessively accumulated, so that the processing proceeds to Step S401, in which the abnormality of the exhaust gas purification device 50 is notified.

When the non-work regeneration transfer conditions (interlock release conditions) are brought into a non-valid state during the execution of the non-work regeneration control due to the release of a locked state by means of the parking brake lever 254, and the like (S313: YES), and after the non-work regeneration control is interrupted (S314), the processing proceeds to Step S304, and the first non-work regeneration request is executed. It is noted that, in S312, it has been determined whether or not the non-work regeneration control is interrupted based on the non-valid state of the non-work regeneration transfer conditions (interlock release conditions), but it may be such that when the regeneration switch 329 is pressed down during the execution of the non-work regeneration control, the non-work regeneration control is interrupted. Accordingly, the non-work regeneration control of the exhaust gas purification device 50 can be interrupted without carrying out troublesome operations, such as an operation in which the diesel engine 1 is stopped, and the non-work regeneration control of the exhaust gas purification device 50 is interrupted.

As described above, in the present embodiment, the start of the regeneration control of the exhaust gas purification device 50, which is instructed by the manual operation of the operator, is made based on the operation in which the regeneration switch 329 is kept pressed down (ON operation for a predetermined period of time (e.g., three seconds)). That is, it is constituted such that when the regeneration switch 329 is successively operated for a longer period of time than an operating time during which it can be determined whether the operation for the regeneration switch 329 is based on the manual operation of the operator or based on the operational errors, the regeneration control of the exhaust gas purification device 50 is started. Accordingly, the operation of the regeneration control that the operator does not assume can be prevented beforehand.

Furthermore, when the operator operates, turns off the key switch, stops the diesel engine 1 during the regeneration control of the exhaust gas purification device 50, and subsequently restarts the diesel engine 1, the regeneration control of the exhaust gas purification device 50 is configured to be reset, so that the operation of the regeneration control that the operator does not assume can be prevented beforehand.

During the execution of the regeneration control as described above, the meter controller 312 controls the flickering operations of the parking brake lamp 346, the PTO lamp 348, the regeneration lamp 332, the engine abnormality lamp 347, and the reverser neutral lamp 349 respectively by means of the display lamps 267a to 267d, and 273 of the meter panel 246. In particular, when the non-work regeneration control is executed, the meter controller 312 causes the parking brake lamp 346, the PTO lamp 348, and the reverser neutral lamp 349 to flicker in accordance with the conditions that have not been established, in order for the operator to recognize the establishment of the non-work regeneration transfer conditions.

Figure 22:
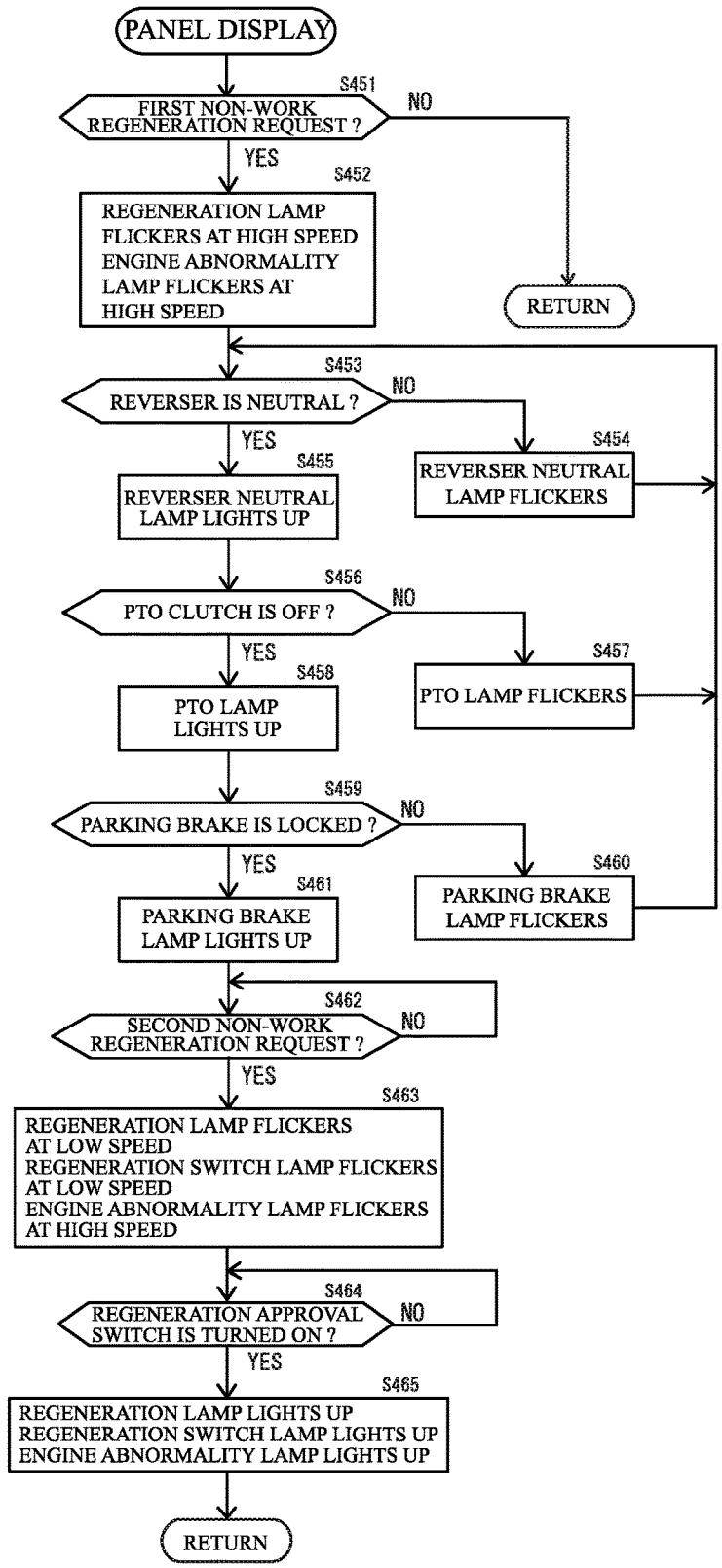
FIG. 22 is a flowchart illustrating a lamp display operation during the non-work regeneration control.

The display operation of the meter panel 246 in the case where the non-work regeneration control is executed will be described below referring to a flowchart in FIG. 22. When the meter controller 312 receives the first non-work regeneration request from the engine controller 311 at Step S304 (S451: YES), the meter controller 312 causes the regeneration lamp 332 and the engine abnormality lamp 347 to flicker at a high speed (S452). Then, the meter controller 312 communicates with the main machine controller 313 and verifies whether or not the forward/backward switching lever 252 is in a neutral state, based on the signal from the forward/backward potentiometer 211 (S453).

Then, when the forward/backward switching lever 252 is disposed on the side of the forward movement or the side of the rearward movement (S453: NO), the meter controller 312 causes the reverser neutral lamp 349 to flicker, along with the regeneration lamp 332 and the engine abnormality lamp 347, in order to urge the operator to bring the forward/backward switching lever 252 into a neutral state (S454). In this time, the flickering frequency of the reverser neutral lamp 349 may be the same with the flickering frequency of the regeneration lamp 332 and the engine abnormality lamp 347. In contrast, when the forward/backward switching lever 252 is in a neutral position (S453: YES), the meter controller 312 causes the reverser neutral lamp 349 to flicker (S455).

Subsequently, the meter controller 312 communicates with the work machine controller 314 and verifies whether or not the PTO clutch switch 225 is in an Off state based on the signal from the PTO clutch switch 225 (S456). When the PTO clutch switch 225 is in an On state (S456: NO), the meter controller 312 causes the PTO lamp 348 to flicker, along with the regeneration lamp 332 and the engine abnormality lamp 347 (S457). In this time, the flickering frequency of the PTO lamp 348 may be the same with the flickering frequency of the regeneration lamp 332 and the engine abnormality lamp 347. In contrast, when the PTO clutch switch 225 is in an Off state (S456: YES), the meter controller 312 causes the PTO lamp 348 to turn off (S458).

Subsequently, the meter controller 312 communicates with the main machine controller 313 and verifies whether or not a lock state is brought by means of the parking brake lever 254 based on the signal from the parking brake switch 236 (S459). When the parking brake switch 236 is in an Off state (S459: NO), the meter controller 312 causes the parking brake lamp 346 to flicker along with the regeneration lamp 332 and the engine abnormality lamp 347, in order to urge the operator to bring about a lock state by means of the parking brake lever 254 (S460). In this time, the flickering frequency of the parking brake lamp 346 may be the same with the flickering frequency of the regeneration lamp 332 and the engine abnormality lamp 347. In contrast, when the parking brake switch 236 is in an On state (S459: YES), the meter controller 312 causes the parking brake lamp 346 to light up (S461).

Thereafter, when the meter controller 312 receives the second non-work regeneration request from the engine controller 311 at Step S306 (S462: YES), the meter controller 312 causes the regeneration lamp 332 and the regeneration switch lamp 345 to flicker at a low speed, and concurrently causes the engine abnormality lamp 347 to flicker at a high speed (S463). Then, as is same with Step S307 described above, it is determined whether or not the operation of keeping the regeneration switch 329 pressed down is made (S464). In this time, when the regeneration switch 329 is turned on for a predetermined period of time (S464: YES), the meter controller 312 causes the regeneration lamp 332, the regeneration switch lamp 345, and the engine abnormality lamp 347 to light up (S465).

In the present embodiment, the non-work regeneration control is applied only to stationary regeneration control (the parking regeneration control or urgency regeneration control) executed after the failure of the reset regeneration control, but as illustrated in FIG. 23, the non-work regeneration control may include recovery regeneration control executed after the failure of the stationary regeneration control. As is the same with the normal operating control, the assist regeneration control and the reset regeneration control can be executed while the work of the work machine (the tractor 1 in the present embodiment) is continuously performed, and the stationary regeneration control and the recovery regeneration control, which are the non-work regeneration control, have a non-work regeneration state in which the work of the work machine is stopped. It is noted that the assist regeneration control and the reset regeneration control are regarded as working regeneration control that is executable during the continuous work, with respect to the non-work regeneration control. Hereinafter, the recovery regeneration control will be briefly described.

When the stationary regeneration control fails (when the clogging state of the exhaust gas purification device 50 is not improved, and the PM is excessively accumulated), the recovery regeneration control is performed. The recovery regeneration control in the present embodiment is divided in two steps, which are comprised of recovery first regeneration control and recovery second regeneration control, and executed. The recovery first regeneration control is such that the PM in the exhaust gas purification device 50 is gradually combusted and removed, and the exhaust gas purification device 50 is gently regenerated, under a condition in which there is a risk of runaway combustion of the PM excessively accumulated. The recovery second regeneration control is such that the exhaust gas purification device 50 is swiftly regenerated under a condition in which there is no risk of runaway combustion.

The entire recovery regeneration control is basically performed in the same way as the mode of the stationary regeneration control, but in the recovery first regeneration control, a target that the exhaust gas temperature of the exhaust gas purification device 50 reaches a temperature TP3 (for example, approximately 500 degrees Celsius) that is lower than that of the non-work regeneration control is set, for example, by reducing the fuel injection amount of the post-injection E, or the like, so as to prevent the runaway combustion of the PM excessively accumulated, and the PM in the exhaust gas purification device 50 is gradually combusted and removed while it takes a long period of time (for example, within approximately 3 to 3.5 hours). In the recovery first regeneration control, the output of the engine 5 is limited to the maximum output during recovery, which is lower than the non-work maximum output (for example, approximately 80 percent of the maximum output). In this case, not only the torque T but also the rotational speed N of the engine 5 is suppressed, and the fuel injection amount of the common rail 341 is adjusted in such a manner as to obtain maximum output during the recovery.

In the recovery second regeneration control, a target that the exhaust gas temperature of the exhaust gas purification device 50 reaches a temperature TP4 (for example, approximately 600 degrees Celsius) that is higher than that of the recovery first regeneration control is set, and the exhaust gas purification device 50 is swiftly regenerated by means of the closing valve of the intake throttle member 78, the after-injection D, the post-injection E, and the predetermined high rotational speed of the engine 5. That is, the mode of the recovery second regeneration control is the same with the mode of the stationary regeneration control. A main difference between the recovery first regeneration control and the recovery second regeneration control is the injection amount of the post-injection E, and for example, the injection amount of the post-injection E during the recovery first regeneration control is less than the injection amount of the post-injection E during the recovery second regeneration control.

As described above, the stationary regeneration control and the recovery regeneration control both are the non-work regeneration control. Accordingly, when any of the stationary regeneration control and the recovery regeneration control is executed, as illustrated in FIG. 19, the engine controller 311 compulsorily controls the drive of the engine 5 with the isochronous control and concurrently controls the drive of the engine 5 with the power mode (the high idle limit release mode).

As described above, as a plurality of regeneration controls, at least the reset regeneration control in which the exhaust gas temperature is raised with the post-injection E, the stationary regeneration control in which the exhaust gas temperature is raised with the combination of the post-injection E and the predetermined high rotational speed, and the recovery regeneration control that is executable when the non-work regeneration control fails, are included. In the stationary regeneration control and the recovery regeneration control, the engine 5 is driven solely for the combustion and removal of the particulate matter, so that the engine 5 is not normally operated in the stationary regeneration control and the recovery regeneration control. That is, the stationary regeneration control and the recovery regeneration control exist as the modes for avoiding crises such as the prevention of damages (dissolved loss) of the exhaust gas purification device 50 and the prevention of excessive emissions.

In view of this, it is set in such a manner as to transfer from the reset regeneration control to the recovery regeneration control through the stationary regeneration control. Then, when the reset regeneration control is transferred to the stationary regeneration control, the control goes through a non-work waiting mode, in which the establishment of the non-work transfer conditions set in advance are waited, and when the stationary regeneration control is transferred to the recovery regeneration control, the control goes through a recovery waiting mode in which the establishment of the recovery transfer conditions set in advance are waited. Then, when each transfer condition is not established, waiting is made in each waiting mode, and when each waiting mode is set once, it is possible to set in such a manner as to transfer only to the stationary regeneration control or the recovery regeneration control. Accordingly, the regeneration control that causes the runaway combustion is not executed, so that the occurrence of the runaway combustion can be prevented, and the avoidance of the crises, such as the prevention of damages (dissolved loss) of the exhaust gas purification device 50 and the prevention of excessive emissions, can be steadily performed.

Also, in the stationary regeneration control, the output of the engine 5 is limited to the non-work maximum output that is lower than the maximum output. In the recovery regeneration control, the output of the engine 5 is limited to the maximum output during the recovery, which is lower than the non-work maximum output. Accordingly, when the stationary regeneration control or the recovery regeneration control is executed, excessive increase in the temperature and pressure of the exhaust gas is prevented, thereby suppressing the deterioration of the exhaust system components such as the exhaust gas purification device 50 due to the increase in temperature and the occurrence of leakage of the exhaust gas from the joining portion of the exhaust system components due to the increase in pressure.

It is noted that the constitution of each portion of the present invention of the instant application is not limited to the embodiments illustrated, but various modifications can be applied without departing from the scope of the gist of the present invention of the instant application.

The embodiments of the present invention of the instant application relates to an engine device that is mounted on work vehicles, for example, such as a construction machine, an agricultural machine, and an engine generator, and the engine device includes an exhaust gas purification device.

What is claimed is:
1. An engine device comprising:
an engine,
an exhaust gas purification device arranged on an exhaust path of the engine, and
an engine controller configured to control a drive of the engine and configured to execute at least one regeneration control to combust and remove particulate matter accumulated in the exhaust gas purification device,
wherein the at least one regeneration control comprises a non-work regeneration control, in which an exhaust gas temperature is raised with the post-injection of fuel into the exhaust gas purification device and with the running of the engine at a predetermined high rotational speed, and wherein the engine controller is configured to:
drive the engine to solely combust and remove the particulate matter in the non-work regeneration control, and
compulsorily execute isochronous control in which a rotational speed of the engine is maintained constant, irrespective of variation in load of the engine, to run the engine at the predetermined high rotational speed,
wherein the non-work regeneration control comprises at least a stationary regeneration control that is executable when regeneration control fails during continuous work, and recovery regeneration control that is executable when the stationary regeneration control fails, and
wherein when the engine controller executes any of the stationary regeneration control or the recovery regeneration control, the engine controller executes said compulsory execution of said isochronous control.

2. The engine device according to claim 1,
wherein the engine controller is configured to alternately select execution of high idle limit mode, in which the rotational speed of the engine is limited to a limit value of a high idle rotational speed, and release of the high idle limit mode, and
wherein, during execution of the non-work regeneration control, the high idle limit mode is compulsorily released, and the engine is driven at the predetermined high rotational speed that is higher than the limit value of the high idle rotational speed.

3. The engine device according to claim 1,
wherein, during execution of the non-work regeneration control, the engine controller limits output of the engine to a non-work maximum output that is lower than a maximum output and drives the engine accordingly.

4. The engine device according to claim 1,
wherein the engine controller is configured to store an output characteristic map having a relation of the rotational speed and a torque of the engine, and
wherein the engine controller is configured such that during execution of a high idle limit mode, after the engine controller corrects the output characteristic map based on a limit value of a high idle rotational speed, the engine controller calculates a target fuel injection amount based on the corrected output characteristic map and drives the engine accordingly.

5. The engine device according to claim 1, wherein the engine controller is configured to be mounted on a work vehicle.

6. The engine device according to claim 5, wherein the predetermined high rotation speed is a parking maximum output in which operating portions of the work vehicle are not driven.

7. The engine device according to claim 1, wherein the recovery regeneration control reduces the fuel injection amount of the post-injection compared with the stationary regeneration control.

8. An engine device comprising:
an engine;
an exhaust gas purification device arranged on an exhaust path of the engine; and
an engine controller configured to control a drive of the engine and configured to execute at least one regeneration control to combust and remove particulate matter accumulated in the exhaust gas purification device;

wherein the at least one regeneration control comprises a non-work regeneration control, in which an exhaust gas temperature is raised with the post-injection of fuel into the exhaust gas purification device and with the running of the engine at a predetermined high rotational speed;

wherein the engine controller is configured to:

drive the engine to solely combust and remove the particulate matter in the non-work regeneration control; and compulsorily execute isochronous control in which a rotational speed of the engine is maintained constant, irrespective of variation in load of the engine, to run the engine at the predetermined high rotational speed;

wherein the engine controller is configured to alternately select execution of high idle limit mode, in which the rotational speed of the engine is limited to a limit value of a high idle rotational speed, and release of the high idle limit mode; and wherein, during execution of the non-work regeneration control, the high idle limit mode is compulsorily released, and the engine is driven at the predetermined high rotational speed that is higher than the limit value of the high idle rotational speed.

9. The engine device according to claim 8, wherein, during execution of the non-work regeneration control, the engine controller limits output of the engine to a non-work maximum output that is lower than a maximum output and drives the engine accordingly.

10. An engine device comprising:

an engine;

an exhaust gas purification device arranged on an exhaust path of the engine; and an engine controller configured to control a drive of the engine and configured to execute at least one regeneration control to combust and remove particulate matter accumulated in the exhaust gas purification device;

wherein the at least one regeneration control comprises a non-work regeneration control, in which an exhaust gas temperature is raised with the post-injection of fuel into the exhaust gas purification device and with the running of the engine at a predetermined high rotational speed;

wherein the engine controller is configured to:

drive the engine to solely combust and remove the particulate matter in the non-work regeneration control; and compulsorily execute isochronous control in which a rotational speed of the engine is maintained constant, irrespective of variation in load of the engine, to run the engine at the predetermined high rotational speed;

wherein the engine controller is configured to store an output characteristic map having a relation of the rotational speed and a torque of the engine; and wherein the engine controller is configured such that during execution of a high idle limit mode, after the engine controller corrects the output characteristic map based on a limit value of a high idle rotational speed, the engine controller calculates a target fuel injection amount based on the corrected output characteristic map and drives the engine accordingly.

* * * * *